US009849880B2

(12) United States Patent
D'Amato et al.

(10) Patent No.: US 9,849,880 B2
(45) Date of Patent: Dec. 26, 2017

(54) METHOD AND SYSTEM FOR VEHICLE CRUISE CONTROL

(71) Applicants: Ford Global Technologies, LLC, Dearborn, MI (US); Honeywell International Inc., Morris Plains, NJ (US)

(72) Inventors: Anthony Mario D'Amato, Canton, MI (US); Dimitar Petrov Filev, Novi, MI (US); John Ottavio Michelini, Sterling Heights, MI (US); Jaroslav Pekar, Pacov (CZ); Ondrej Santin, Prague (CZ); Jonathan Thomas Mullen, Palo Alto, CA (US)

(73) Assignees: Ford Global Technologies, LLC, Dearborn, MI (US); HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/049,603

(22) Filed: Feb. 22, 2016

(65) Prior Publication Data
US 2016/0297435 A1 Oct. 13, 2016

Related U.S. Application Data

(60) Provisional application No. 62/146,880, filed on Apr. 13, 2015, provisional application No. 62/148,095, filed on Apr. 15, 2015.

(51) Int. Cl.
*B60W 30/14* (2006.01)
*B60W 50/00* (2006.01)
(Continued)

(52) U.S. Cl.
CPC .......... *B60W 30/143* (2013.01); *B60W 10/04* (2013.01); *B60W 30/18072* (2013.01);
(Continued)

(58) Field of Classification Search
CPC .. B60W 30/14–30/17; B60W 50/0097; B60W 2550/142; B60W 2550/143; B60W 30/18072
See application file for complete search history.

(56) References Cited

U.S. PATENT DOCUMENTS 6,167,357 A * 12/2000 Zhu ........................ B60T 8/172
701/102
6,278,931 B1 8/2001 Crawford et al.
(Continued)

FOREIGN PATENT DOCUMENTS

WO WO 2014/003653 A1 * 1/2014
WO WO 2014/126523 A1 * 8/2014
(Continued)

OTHER PUBLICATIONS

Clockaerts, Michael et al., "Development of an eco-drive assist system using online parameter estimation", 2012 TML Thesis, Transport & Mobility Leuven, © 2012 KU Leuven, Katholieke Universiteit, 8 pages.*
(Continued)

*Primary Examiner* — Behrang Badii
*Assistant Examiner* — David Testardi
(74) *Attorney, Agent, or Firm* — Julia Voutyras; McCoy Russell LLP

(57) ABSTRACT

Methods and systems are presented for improving performance of a vehicle operating in a cruise control mode where a controller adjusts torque output from a vehicle to maintain vehicle speed within a desired range. The methods and systems include adapting a vehicle dynamics model and a vehicle fuel consumption model that provide input to nonlinear model predictive controller.

18 Claims, 11 Drawing Sheets

(51) Int. Cl.
  *B60W 10/04* (2006.01)
  *B60W 30/18* (2012.01)
(52) U.S. Cl.
  CPC . *B60W 50/0097* (2013.01); *B60W 2030/1809* (2013.01); *B60W 2050/0013* (2013.01); *B60W 2050/0014* (2013.01); *B60W 2550/142* (2013.01); *B60W 2710/0666* (2013.01); *Y02T 10/56* (2013.01)

(56) References Cited

U.S. PATENT DOCUMENTS

| | | |
|---|---|---|
| 6,370,472 B1 | 4/2002 | Fosseen |
| 6,990,401 B2 | 1/2006 | Neiss et al. |
| 7,437,232 B2 | 10/2008 | Tengler et al. |
| 8,036,803 B2 | 10/2011 | Michi et al. |
| 8,346,456 B2 | 1/2013 | Kleksic et al. |
| 8,452,509 B2 | 5/2013 | Sujan et al. |
| 8,498,795 B2 | 7/2013 | Eriksson et al. |
| 8,620,557 B2 | 12/2013 | Johansson et al. |
| 8,620,558 B2 | 12/2013 | Johansson et al. |
| 8,700,256 B2 | 4/2014 | Duraiswamy et al. |
| 8,744,718 B2 | 6/2014 | Johansson et al. |
| 8,954,255 B1 | 2/2015 | Crawford |
| 2003/0221886 A1 | 12/2003 | Petrie, Jr. |
| 2006/0293822 A1 | 12/2006 | Lattemann et al. |
| 2010/0049400 A1* | 2/2010 | Duraiswamy ....... B60W 30/143 701/33.4 |
| 2011/0066308 A1* | 3/2011 | Yang ............... B60W 20/12 701/22 |
| 2011/0106388 A1* | 5/2011 | Boeckenhoff ......... B60W 10/06 701/70 |
| 2011/0130939 A1 | 6/2011 | Hartmann et al. |
| 2012/0239268 A1 | 9/2012 | Chen et al. |
| 2013/0030668 A1 | 1/2013 | Eriksson et al. |
| 2013/0226420 A1* | 8/2013 | Pedlar ............. B60K 31/047 701/67 |
| 2014/0005906 A1* | 1/2014 | Pandita ............. B60W 30/17 701/96 |
| 2014/0074370 A1* | 3/2014 | Johansson ......... B60W 50/0097 701/93 |
| 2014/0200788 A1* | 7/2014 | Eriksson ........... B60K 31/0058 701/93 |
| 2014/0350820 A1* | 11/2014 | Johansson ........... B60K 31/00 701/93 |
| 2014/0350821 A1* | 11/2014 | Johansson ......... B60W 50/0097 701/93 |
| 2015/0168157 A1* | 6/2015 | Hoch ............... G01C 21/3469 701/400 |
| 2015/0321670 A1* | 11/2015 | Johansson ......... B60W 50/0097 701/94 |
| 2016/0332633 A1* | 11/2016 | Raffone ............. G01C 9/08 |
| 2017/0158204 A1* | 6/2017 | Roos ............... B60W 50/0097 |
| 2017/0198655 A1* | 7/2017 | Roos ............... F02D 41/065 |

FOREIGN PATENT DOCUMENTS

| | | |
|---|---|---|
| WO | WO 2014/149042 A1 * | 9/2014 |
| WO | WO 2014/149043 A1 * | 9/2014 |
| WO | WO 2014/149044 A1 * | 9/2014 |

OTHER PUBLICATIONS

Frömberg, Anders, "Efficient simulation and optimal control for vehicle propulsion", Linköping Studies in Science and Technology. Dissertations. No. 1180, Department of Electrical Engineering, Linköpings Universitet, 2008, 168 pages.*

Hellström, Erik, "Explicit use of road topography for model predictive cruise control in heavy trucks", Master's Thesis, Linköpings Universitet, downloaded from: http://www.diva-portal.se/smash/get/diva2:20186/FULLTEXT01.pdf, DiVA Public Availability Date: Apr. 12, 2005, 79 pages.*

Huang, Wei, "Design and Evaluation of a 3D Road Geometry Based Heavy Truck Fuel Optimization System", Ph.D. Thesis, Auburn University, UMI No. 3430642, Copyright 2010 by ProQuest LLC, 137 pages.*

Kidambi, Narayanan et al., "Methods in Vehicle Mass and Road Grade Estimation", SAE Technical Paper 2014-01-0111, published Apr. 1, 2014, Society of Automotive Engineers, 11 pages.*

Shakouri, Payman et al., "Fuel efficiency by coasting in the vehicle", International Journal of Vehicular Technology, vol. 2013, Article ID 391650, Copyright © 2013 Payman Shakouri et al., 14 pages.*

Shakouri, Payman et al., "Nonlinear Model Predictive Control approach in design of Adaptive Cruise Control with automated switching to cruise control", Control Engineering Practice 26 (2014), pp. 160-177.*

Vahidi, A. et al., "Recursive least squares with forgetting for online estimation of vehicle mass and road grade: theory and experiments", Vehicle System Dynamics (Taylor & Francis), vol. 43, No. 1, Jan. 2005, pp. 31-55.*

Fröberg, Anders, "Efficient simulation and optimal control for vehicle propulsion", Linkoping Studies in Science and Technology, Dissertations, No. 1180, Department of Electrical Engineering, Linkopings Universitet, 2008, 168 pages.*

Fröberg, Anders et al., "Controlling gear engagement and disengarement on heavy trucks for minimization of fuel consumption", 16th Triennial IFAC World Congress, Prague, Czech Republic, Jul. 4-8, 2005, Copyright (c) 2005 IFAC, pp. 7-12.*

Hellström et al., "A real-time fuel-optimal cruise controller for heavy trucks using road topography information", SAE Paper 2006-01-0008, 2006 SAE World Congress, Detroit, Michigan, Apr. 3-6, 2006, 10 pages.*

Scania, "Spectacular fuel savings—Scania Opticruise with performance modes", Press Release, Mar. 21, 2013, 6 pages.*

Cunningham, Ralph Wayne et al., "Methods and System for Decelerating a Vehicle," U.S. Appl. No. 15/170,014, filed Jun. 1, 2016, 39 pages.

* cited by examiner

METHOD AND SYSTEM FOR VEHICLE CRUISE CONTROL

CROSS REFERENCE TO RELATED APPLICATION

The present application claims priority to U.S. Provisional Patent Application No. 62/146,880, entitled "METHOD AND SYSTEM FOR VEHICLE CRUISE CONTROL," filed on Apr. 13, 2015, the entire contents of which are hereby incorporated by reference for all purposes; the present application also claims priority to U.S. Provisional Patent Application No. 62/148,095, entitled "SYSTEM AND APPROACH FOR FUEL ECONOMY OPTIMIZATION IN CRUISE CONTROL," filed on Apr. 15, 2015.

FIELD

The present description relates generally to methods and systems for controlling speed of a vehicle operating in a cruise control mode where a vehicle driver requests vehicle speed to be controlled automatically.

BACKGROUND/SUMMARY

A vehicle may have its speed controlled automatically to a desired speed via a controller with little input from a vehicle driver. One example way for a controller to regulate vehicle speed is to operate the vehicle in a cruise control mode. Cruise control mode may be described as a vehicle operating mode where vehicle speed is maintained within a desired vehicle speed range bounded via upper and lower vehicle speed thresholds without the driver requesting torque from a vehicle motive power source. The controller maintains vehicle speed within the desired speed range via adjusting torque output of the vehicle's motive power source. Thus, vehicle speed is maintained within a desired speed range via increasing and decreasing torque output of the vehicle motive power source. One way for the controller to maintain vehicle speed is to proportionately adjust torque output from the vehicle motive power source based an error in vehicle speed. The controller may apply a proportional/integral/derivative (PID) algorithm or some similar variant to adjust torque output of the vehicle motive power source and maintain vehicle speed within the desired vehicle speed range. However, PID vehicle speed control algorithms are reactionary in that they rely predominantly on a present or current vehicle speed error to provide a revised vehicle speed trajectory. As a result, and because vehicles are often operated in a higher gear in cruise control mode, the controller may make large changes in torque it requests from the vehicle's motive power source. The swings in requested torque may increase vehicle fuel consumption and disturb the driver.

The inventors herein have recognized the above-mentioned issue and have developed a vehicle system, comprising: a vehicle including a motive torque source; and a controller in the vehicle, the controller including executable instructions stored in non-transitory memory, the instructions including an adaptive nonlinear model predictive cruise control routine.

By adapting vehicle models and providing output from the adapted vehicle models to a nonlinear model predictive cruise control routine, it may be possible to provide the technical result of reducing vehicle torque demand swings while operating a vehicle in a cruise control mode. The torque swings may be reduced, at least in part, based on a priori road grade information. Further, adapting the vehicle model and a vehicle fuel consumption model real-time while the vehicle is in cruise control mode allows the nonlinear model predictive cruise control mode to adjust torque control strategy from a constant torque output to a pulse and glide torque output, thereby allowing multiple torque solution strategies from the controller for same driving conditions, excepting for changes in a vehicle fuel consumption model due to fuel properties or other changes in engine operating characteristics. The fuel economy optimal strategy is therefore selected automatically based on actual characteristic of the vehicle fuel consumption model.

The present description may provide several advantages. In particular, the approach may reduce the propensity for larger changes in requested vehicle torque to maintain vehicle speed. Additionally, the approach may reduce a vehicle's operating cost via reducing fuel consumption. Further, the approach may further reduce vehicle fuel consumption by actively requesting a transmission shift to neutral while operating the vehicle in cruise control mode.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
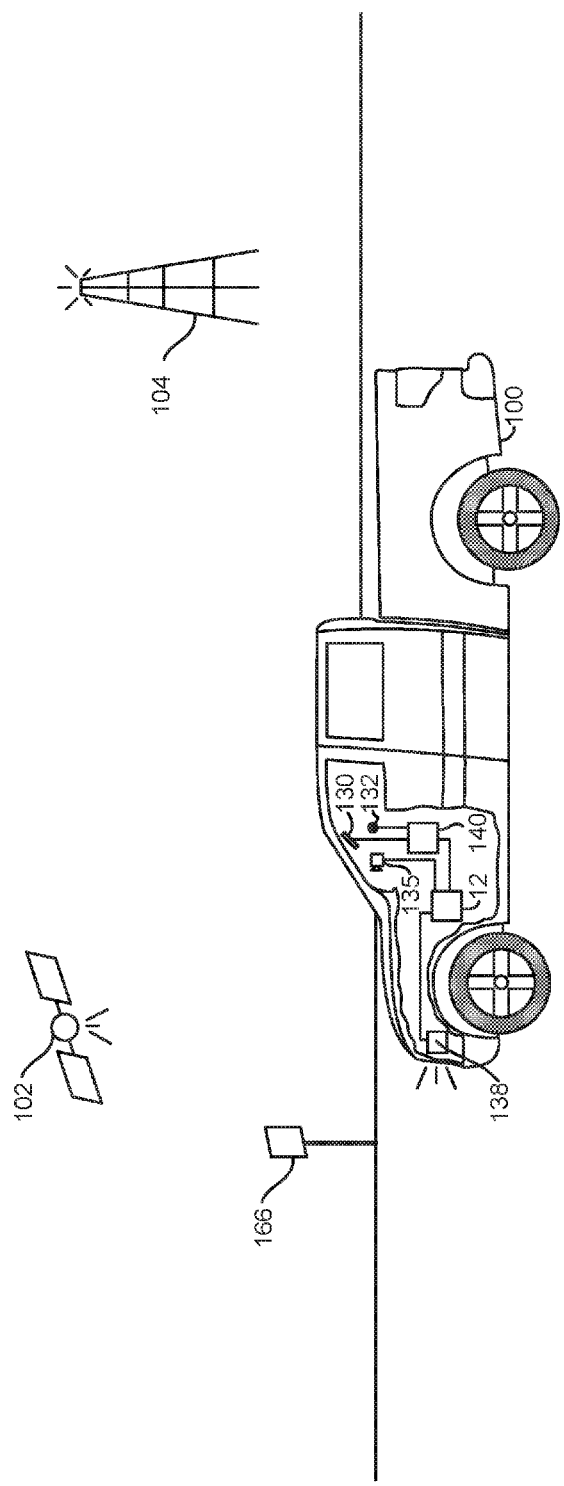
FIG. 1 shows an example vehicle that may be included in the systems and methods described herein.
Figure 2:
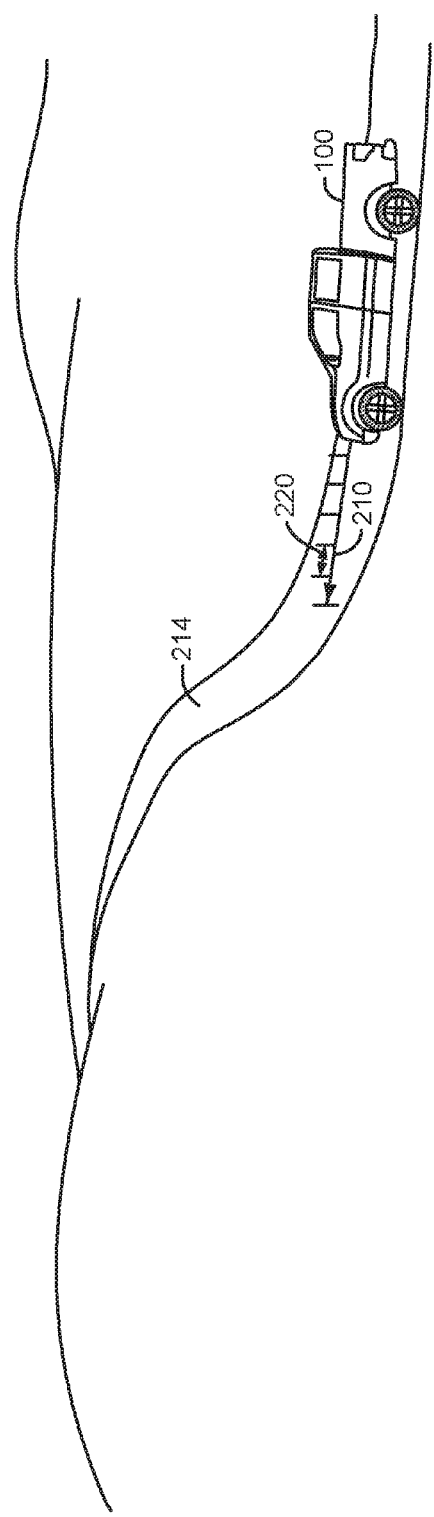
FIG. 2 shows an example vehicle and its electronic horizon.
Figure 3:
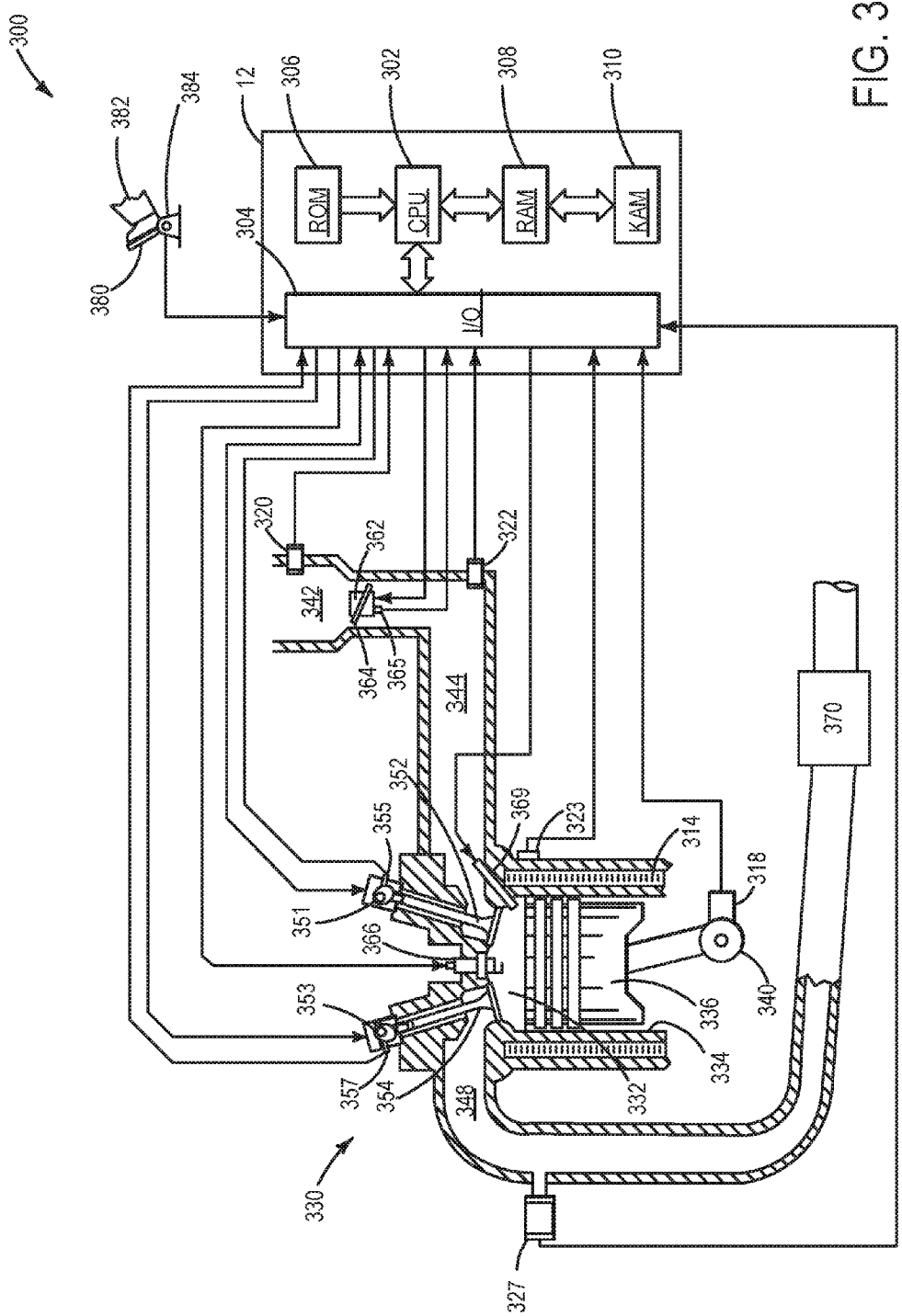
FIG. 3 shows an example vehicle motive power source.
Figure 4:
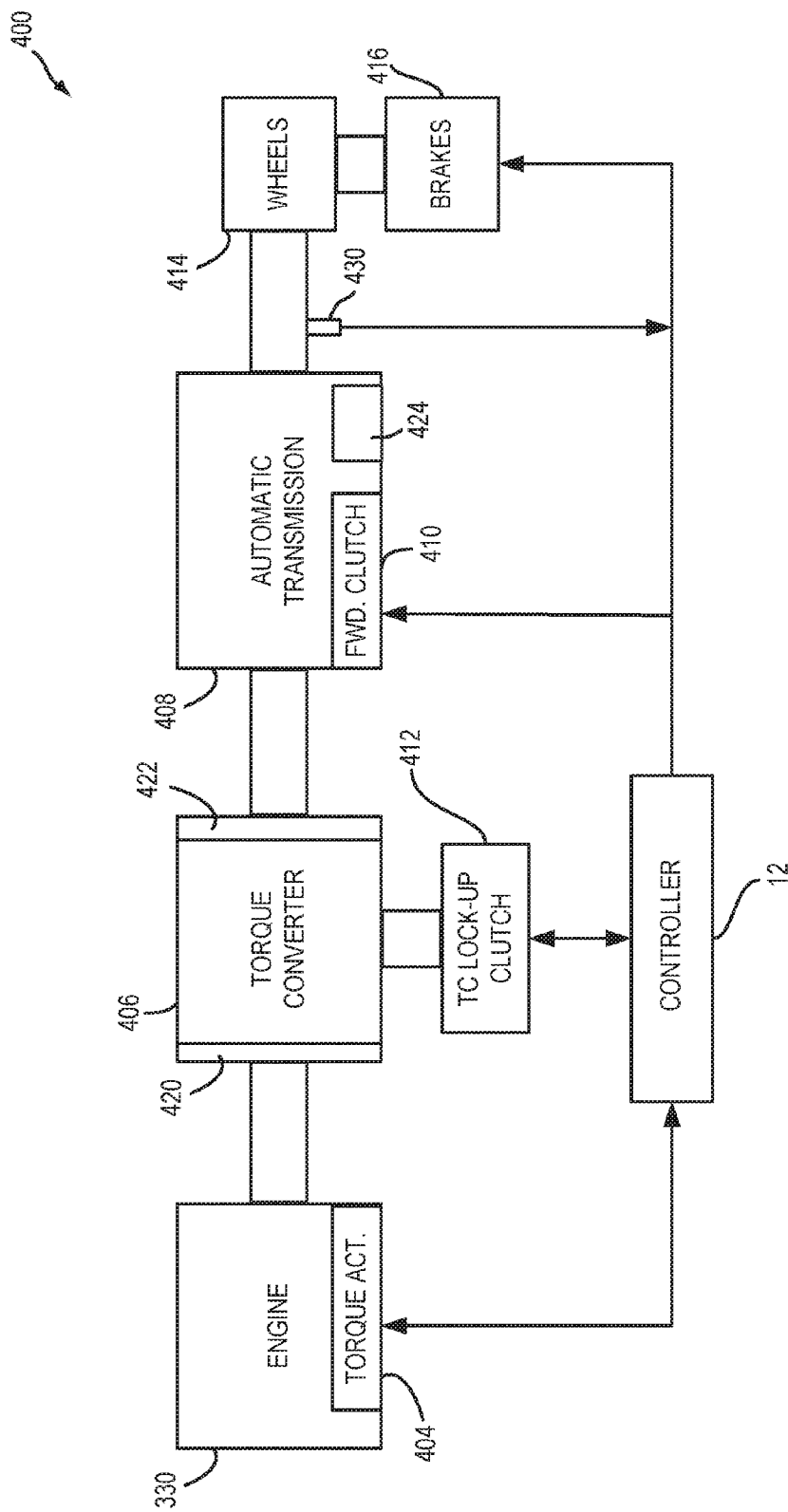
FIG. 4 shows an example vehicle driveline including the vehicle motive power source.
Figure 5:
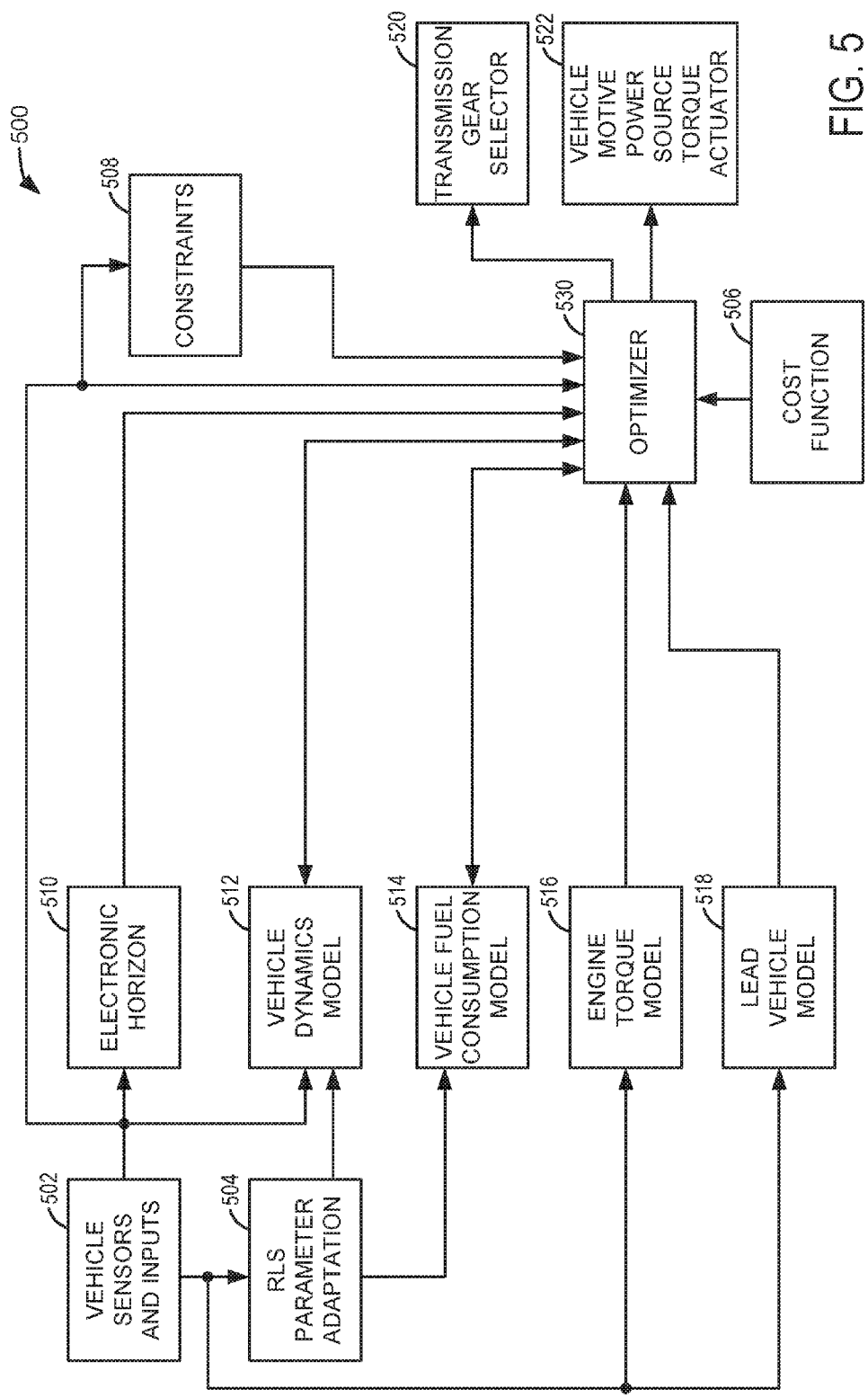
FIG. 5 shows a block diagram of an example vehicle cruise control system.
Figure 9A:
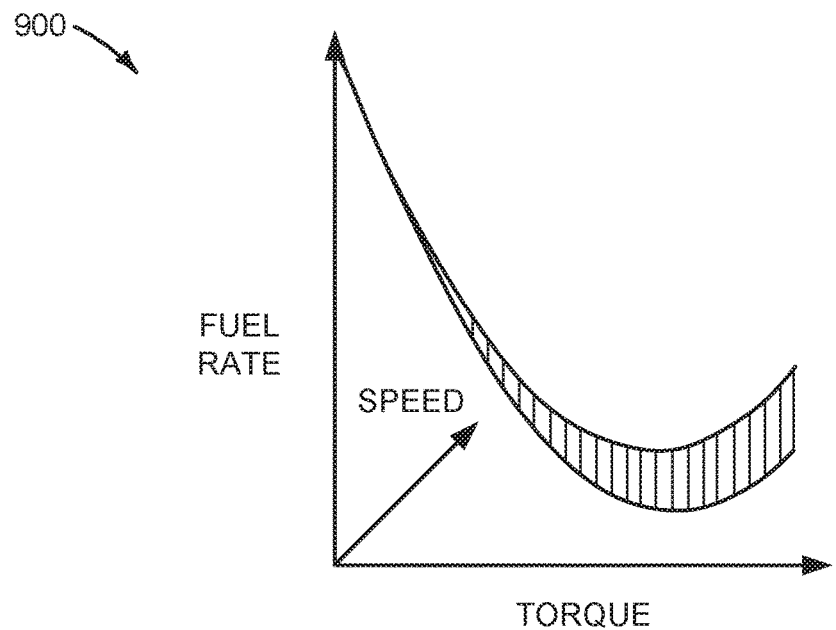
FIGS. 9A and 9B show example vehicle fuel consumption models.
Figure 9B:
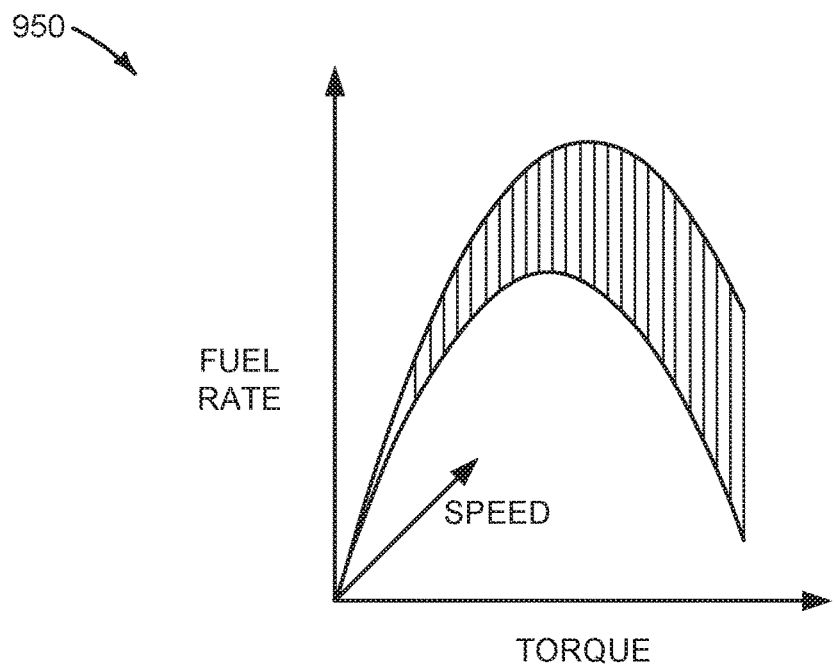
Figure 10:
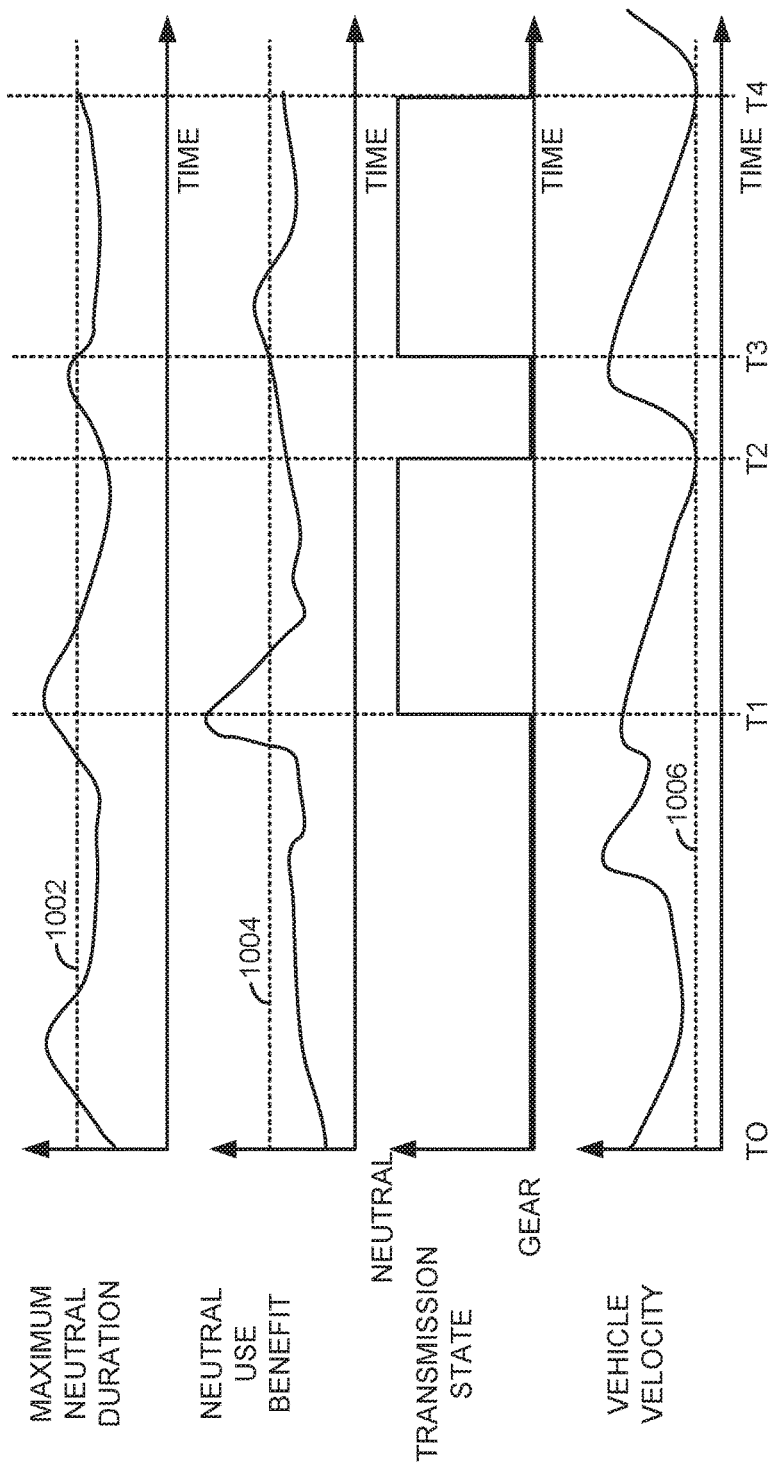
FIG. 10 shows an example vehicle cruise control sequence with neutral select.

The following description relates to systems and methods for improving operation of a vehicle operating in a cruise control mode. FIG. 1 shows a non-limiting example vehicle for operating in a cruise control mode where a controller applies a nonlinear model predictive cruise control algorithm with fuel optimization. FIG. 2 shows the example vehicle and an electronic horizon which provides input to the adaptive nonlinear model predictive cruise control algorithm. FIGS. 3 and 4 show non-limiting vehicle motive power sources within a vehicle driveline. FIG. 5 is a block diagram of an example vehicle cruise control system. Methods for operating a vehicle in cruise control including one example version of the adaptive nonlinear model predictive cruise control algorithm are provided in FIGS. 6A-8. Example vehicle motive power source fuel consumption models are shown in FIGS. 9A and 9B. FIG. 10 is an example vehicle cruise control mode operating sequence.

Referring now to FIG. 1, vehicle 100 includes a controller 12 for receiving sensor data and adjusting actuators. Controller 12 may operate vehicle 100 in a cruise control mode where vehicle speed is maintained within a desired vehicle speed range bounded by upper and lower vehicle speed thresholds. In some examples, controller 12 may cooperate with additional controllers to operate vehicle 100. Vehicle 100 is shown with global positioning system (GPS) receiver 130. Satellite 102 provides time stamped information to GPS receiver 130 which relays the information to vehicle position determining system 140. Vehicle positioning determination system 140 relays present and future road grade data to controller 12. Vehicle 100 may also be equipped with optional camera 135 for surveying road conditions in the path of vehicle 135. For example, camera 135 may acquire road conditions from road side signs 166 or displays. Vehicle position determining system 140 may alternatively acquire information for determining vehicle position from stationary broadcast tower 104 via receiver 132. In some examples, vehicle 100 may also include a sensor 138 for determining the proximity of vehicles in the travel path of vehicle 100. Sensor 138 may be laser, sound, or radar signal based.

In this example, vehicle 100 is shown as a passenger vehicle. However, in some examples, vehicle 100 may be a commercial vehicle such as a freight hauling semi-trailer and truck, a train, or a ship.

Referring now to FIG. 2, an example vehicle 100 and a distance 210 corresponding to the vehicle's electronic horizon is shown. Vehicle 100 generates an electronic horizon (e.g., a data vector) comprised of road grade information for road 214. The electronic horizon is made up of a plurality of blocks 220 or segments, and the blocks have a single associated or corresponding road grade or slope. The block's length may be based on distance or time. The road grade information is provided for a predetermined distance 210 or a predetermined amount of time in the vehicle's travel path. The road grade information may be provided to controller 12 shown in FIG. 1. For example, the road grade may be provided for a predetermined distance in the path of vehicle 100, 1500 meters for example. Alternatively, road grade may be provided for a predetermined amount of time into the future of the vehicle's travel path. For example, road grade may be provided 10 seconds into the future for a vehicle traveling at 110 Km/hr, or about 1833 meters. Road grade data may be stored in memory of vehicle position determining system 140 shown in FIG. 1 or it may be determined based on road altitude values stored in memory. In one example, the road grade values may be retrieved from memory by indexing the memory based on vehicle position and heading. Values of road grade that occur over the predetermined distance or time may be stored as an array or vector in memory, and updates to the array may be provided as the vehicle moves in a first-in first-out basis. For example, if a road grade value is provided for every 100 meters of road surface, an array corresponding to 1500 meters of road grade data includes 15 blocks and their corresponding road grade values. The road grade values may change step-wise between blocks.

Referring now to FIG. 3, an example vehicle motive power source is shown. In this example, the vehicle motive power source is a spark ignition engine. However, the vehicle motive power source may be a diesel engine, a turbine, or an electric machine.

FIG. 3 is schematic diagram showing one cylinder of a multi-cylinder engine 330 in an engine system 300 is shown. Engine 330 may be controlled at least partially by a control system including a controller 12 and by input from a vehicle operator 382 via an input device 380. In this example, the input device 380 includes an accelerator pedal and a pedal position sensor 384 for generating a proportional pedal position signal.

A combustion chamber 332 of the engine 330 may include a cylinder formed by cylinder walls 334 with a piston 336 positioned therein. The piston 336 may be coupled to a crankshaft 340 so that reciprocating motion of the piston is translated into rotational motion of the crankshaft. The crankshaft 340 may be coupled to at least one drive wheel of a vehicle via an intermediate transmission system. Further, a starter motor may be coupled to the crankshaft 340 via a flywheel to enable a starting operation of the engine 330.

Combustion chamber 332 may receive intake air from an intake manifold 344 via an intake passage 342 and may exhaust combustion gases via an exhaust passage 348. The intake manifold 344 and the exhaust passage 348 can selectively communicate with the combustion chamber 332 via respective intake valve 352 and exhaust valve 354. In some examples, the combustion chamber 332 may include two or more intake valves and/or two or more exhaust valves.

In this example, the intake valve 352 and exhaust valve 354 may be controlled by cam actuation via respective cam actuation systems 351 and 353. The cam actuation systems 351 and 353 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 352 and exhaust valve 354 may be determined by position sensors 355 and 357, respectively. In alternative examples, the intake valve 352 and/or exhaust valve 354 may be controlled by electric valve actuation. For example, the cylinder 332 may alternatively include an intake valve controlled via electric valve actuation and an exhaust valve controlled via cam actuation including CPS and/or VCT systems.

A fuel injector 369 is shown coupled directly to combustion chamber 332 for injecting fuel directly therein in proportion to the pulse width of a signal received from the controller 12. In this manner, the fuel injector 369 provides what is known as direct injection of fuel into the combustion chamber 332. The fuel injector may be mounted in the side of the combustion chamber or in the top of the combustion chamber, for example. Fuel may be delivered to the fuel injector 369 by a fuel system (not shown) including a fuel tank, a fuel pump, and a fuel rail. In some examples, the combustion chamber 332 may alternatively or additionally include a fuel injector arranged in the intake manifold 344 in a configuration that provides what is known as port injection of fuel into the intake port upstream of the combustion chamber 332.

Spark is provided to combustion chamber 332 via spark plug 366. The ignition system may further comprise an ignition coil (not shown) for increasing voltage supplied to spark plug 366. In other examples, such as a diesel, spark plug 366 may be omitted.

The intake passage 342 may include a throttle 362 having a throttle plate 364. In this particular example, the position of throttle plate 364 may be varied by the controller 12 via a signal provided to an electric motor or actuator included with the throttle 362, a configuration that is commonly referred to as electronic throttle control (ETC). In this manner, the throttle 362 may be operated to vary the intake air provided to the combustion chamber 332 among other engine cylinders. The position of the throttle plate 364 may be provided to the controller 12 by a throttle position signal. The intake passage 342 may include a mass air flow sensor 320 and a manifold air pressure sensor 322 for sensing an amount of air entering engine 330.

An exhaust gas sensor 327 is shown coupled to the exhaust passage 348 upstream of an emission control device 370 according to a direction of exhaust flow. The sensor 327 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 327 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 370 is shown arranged along the exhaust passage 348 downstream of the exhaust gas sensor 327. The device 370 may be a three way catalyst (TWC), $NO_x$ trap, various other emission control devices, or combinations thereof. In some examples, during operation of the engine 330, the emission control device 370 may be periodically reset by operating at least one cylinder of the engine within a particular air-fuel ratio.

The controller 12 is shown in FIG. 3 as a microcomputer, including a microprocessor unit 302, input/output ports 304, an electronic storage medium for executable programs and calibration values shown as read only memory chip 306 (e.g., non-transitory memory) in this particular example, random access memory 308, keep alive memory 310, and a data bus. The controller 12 may receive various signals from sensors coupled to the engine 330, in addition to those signals previously discussed, including measurement of inducted mass air flow (MAF) from the mass air flow sensor 320; engine coolant temperature (ECT) from a temperature sensor 323 coupled to a cooling sleeve 314; an engine position signal from a Hall effect sensor 318 (or other type) sensing a position of crankshaft 340; throttle position from a throttle position sensor 365; and manifold absolute pressure (MAP) signal from the sensor 322. An engine speed signal may be generated by the controller 12 from crankshaft position sensor 318. Manifold pressure signal also provides an indication of vacuum, or pressure, in the intake manifold 344. Note that various combinations of the above sensors may be used, such as a MAF sensor without a MAP sensor, or vice versa. During engine operation, engine torque may be inferred from the output of MAP sensor 322 and engine speed. Further, this sensor, along with the detected engine speed, may be a basis for estimating charge (including air) inducted into the cylinder. In one example, the crankshaft position sensor 318, which is also used as an engine speed sensor, may produce a predetermined number of equally spaced pulses every revolution of the crankshaft.

The storage medium read-only memory 306 can be programmed with computer readable data representing non-transitory instructions executable by the processor 302 for performing at least portions of the methods described below as well as other variants that are anticipated but not specifically listed.

During operation, each cylinder within engine 330 typically undergoes a four stroke cycle: the cycle includes the intake stroke, compression stroke, expansion stroke, and exhaust stroke. During the intake stroke, generally, the exhaust valve 354 closes and intake valve 352 opens. Air is introduced into combustion chamber 332 via intake manifold 344, and piston 336 moves to the bottom of the cylinder so as to increase the volume within combustion chamber 332. The position at which piston 336 is near the bottom of the cylinder and at the end of its stroke (e.g., when combustion chamber 332 is at its largest volume) is typically referred to by those of skill in the art as bottom dead center (BDC).

During the compression stroke, intake valve 352 and exhaust valve 354 are closed. Piston 336 moves toward the cylinder head so as to compress the air within combustion chamber 332. The point at which piston 336 is at the end of its stroke and closest to the cylinder head (e.g., when combustion chamber 332 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 366, resulting in combustion.

During the expansion stroke, the expanding gases push piston 336 back to BDC. Crankshaft 340 converts piston movement into a rotational torque of the rotary shaft. Finally, during the exhaust stroke, the exhaust valve 354 opens to release the combusted air-fuel mixture to exhaust manifold 348 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 3 shows only one cylinder of a multi-cylinder engine, and each cylinder may similarly include its own set of intake/exhaust valves, fuel injector, spark plug, etc.

Referring now to FIG. 4, a schematic of a vehicle drive-train 400 is shown. Drive-train 400 may be powered by engine 330 as shown in greater detail in FIG. 3. In one example, engine 330 may be a gasoline engine. In alternate examples, other engine configurations may be employed, for example, a diesel engine. Engine 330 may be started with an engine starting system (not shown). Further, engine 330 may generate or adjust torque via torque actuator 404, such as a fuel injector, throttle, cam, etc.

An engine output torque may be transmitted to torque converter 406 to drive a step-ratio automatic transmission 408 by engaging one or more clutches, including forward clutch 410, where the torque converter may be referred to as a component of the transmission. Torque converter 406 includes an impeller 420 that transmits torque to turbine 422 via hydraulic fluid. One or more gear clutches 424 may be engaged to change gear ratios between engine 310 and vehicle wheels 414. The output of the torque converter 406 may in turn be controlled by torque converter lock-up clutch 412. As such, when torque converter lock-up clutch 412 is fully disengaged, torque converter 406 transmits torque to automatic transmission 408 via fluid transfer between the torque converter turbine 422 and torque converter impeller 420, thereby enabling torque multiplication. In contrast, when torque converter lock-up clutch 412 is fully engaged, the engine output torque is directly transferred via the torque converter clutch 412 to an input shaft of transmission 408. Alternatively, the torque converter lock-up clutch 412 may be partially engaged, thereby enabling the amount of torque relayed to the transmission to be adjusted. A controller 12 may be configured to adjust the amount of torque transmitted by the torque converter by adjusting the torque converter lock-up clutch in response to various engine operating conditions, or based on a driver-based engine operation request.

Torque output from the automatic transmission 408 may in turn be relayed to wheels 414 to propel the vehicle. Specifically, automatic transmission 408 may adjust an input driving torque at the input shaft (not shown) responsive to a vehicle traveling condition before transmitting an output driving torque to the wheels. Vehicle speed may be determined via speed sensor 430.

Further, wheels 414 may be locked by engaging wheel brakes 416. In one example, wheel brakes 416 may be engaged in response to the driver pressing his foot on a brake pedal (not shown). In the similar way, wheels 414 may be unlocked by disengaging wheel brakes 416 in response to the driver releasing his foot from the brake pedal.

Referring now to FIG. 5, a block diagram of an example vehicle cruise control system is shown. Cruise control system 500 includes vehicle sensors as shown at block 502. Vehicle sensors may include but are not limited to sensors for determining vehicle motive power source torque, speed, energy consumption or fuel consumption, ambient environmental operating conditions, distance measuring devices, GPS signals, road conditions, and driver inputs. Driver inputs may include a desired vehicle speed, brake pedal position, accelerator pedal position, a higher vehicle speed threshold, and a lower vehicle speed threshold. Vehicle sensor information may be input to electronic horizon 510, controller constraints 508, the vehicle dynamics model 512, the model predictive cruise control optimizer 530, a recursive least squares parameter adaptor 504, a vehicle fuel consumption model 514, an engine torque model 516, and a lead vehicle model 518.

Electronic horizon block 510 may be included in controller 12 of FIG. 1 or it may be included in vehicle position determining system 140 shown in FIG. 1. An electronic horizon may be comprised of an array of memory locations or a vector of data and the array may include a plurality of road grade values that describe road grade of the road the vehicle is traveling. In one example, the electronic horizon extracts road grade values from a database that describes road conditions (e.g., grade values stored in memory, the grade values extracted from a three dimensional map of the earth's surface). The road grade values may include road grade at the vehicle's present position as well as road grade values in front of the vehicle in the vehicle's path of travel. The road grade may be converted to road angle. Electronic horizon block 510 updates the array or vector of road grade values at selected times and sends the updated array to cruise control optimizer 530. The road grade values may be provided for a predetermined travel time in the future or for a predetermined distance in front of the vehicle.

At block 512, cruise control system 500 includes a vehicle dynamics model. The vehicle dynamics model is physics based and may be described as:

$$m\frac{dv}{dt} = F_{Trac} - F_{Aero} - F_{Roll} - F_{grad} - F_{Brake}$$

where m is the vehicle mass, v is vehicle speed, $F_{Trac}$ is traction force defined as:

$$F_{Trac} = \frac{\xi_{DL}}{R_{WH}}\gamma(G)R_{FDR}T$$

$F_{Aero}$ is aerodynamic resistance defined as:

$$F_{Aero} = \frac{1}{2}\rho C_d A v^2$$

$F_{Roll}$ is tire rolling resistance defined as:

$$F_{Roll} = mg(k_1 v^2 + k_2)\cos\phi.$$

$F_{Grade}$ is grade force defined as:

$$F_{Grade} = mg\sin\phi$$

wheel brake force is $F_{brake}$, driveline losses are $\xi_{DL}$; effective wheel radius is $R_{WH}$; transmission gear ratio is $\gamma(G)$; selected gear ratio is G; the vehicle's final drive ratio is $R_{FDR}$; motive power source brake torque is T; ambient air density is $\rho$; the vehicle's frontal area is A; the vehicle's aerodynamic drag coefficient is $C_d$; gravitational acceleration is g; tire rolling resistance coefficients are $k_1$ and $k_2$; road angle is $\phi$; t is time; and vehicle mass is m.

The vehicle dynamics model is simplified to:

$$\frac{dv}{dt} = \beta_1 T + \beta_2 v^2 + \beta_3 \varphi + \beta_4$$

where $\beta_1$-$\beta_4$ are adaptive coefficients. The simplification allows for recursive least squares (RLS) adaptation, or another suitable method, of the $\beta_1$-$\beta_4$ terms. The adapted parameters improve the vehicle dynamics model performance, and improved vehicle dynamics model performance improves nonlinear model predictive controller performance. The adaptive parameters are adjustable to compensate for changes in vehicle mass, wind, tire condition, and other vehicle operating conditions. The vehicle dynamics model may be further augmented by adding in a disturbance term $d_v$. The value of $d_v$ may be estimated more frequently than the beta terms, and in one example, it may be estimated via an Extended Kalman Filter.

At block 514, cruise control system 500 includes a vehicle fuel consumption model. The vehicle fuel consumption model estimates vehicle fuel consumption, and it provides input to optimizing vehicle fuel economy in optimizer block 530. The vehicle fuel consumption is expressed as a polynomial of the form:

$$\dot{m}_{Fuel} = c_5 T^3 + c_4 T^2 + c_3 T + c_2 Tv + c_1 v + c_0$$

where $\dot{m}_{Fuel}$ is fuel flow to the vehicle's motive power source; and $c_0$-$c_5$ are adaptive coefficients. The vehicle fuel flow model allows for recursive least squares (RLS) adaption, or another suitable method, of the $c_0$-$c_5$ terms. The adapted parameters improve the vehicle fuel consumption model performance, and an improved vehicle fuel consumption model performance improves nonlinear model predictive controller performance.

At block 504, cruise control system 500 includes a recursive least squares parameter estimator for adjusting the β and c coefficients for the vehicle dynamics model and the vehicle fuel consumption model. It is desirable to adjust the β and c coefficients as vehicle operating conditions change so that a desired level of controller performance may be achieved. The recursive least square estimator recursively adapts the parameter vector x satisfying the set of equations (in a matrix form):

$$y_k = H_k x + v_k.$$

The new parameter estimate is:

$$\tilde{x}_k = \tilde{x}_{k-1} + K_k(y_k - H_k \tilde{x}_{k-1})$$

where $H_k$ is a m×n matrix, $K_k$ is a n×m estimator gain, and $y_k - H_k x_{k-1}$ is a correction term. where the noise $v_k$ has zero mean and covariance $R_k$. The estimator gain $K_k$ and covariance matrix $P_k$ are updated as follows:

$$K_k = P_{k-1} H_k^T (H_k P_{k-1} H_k^T + R_k)^{-1},$$

$$P_k = (I - K_k H_k) P_{k-1}$$

The recursive least square estimator is initialized by:

$$\tilde{x}_0 = E(x),$$

$$P_0 = E((x - \tilde{x}_0)(x - \tilde{x}_0)^T)$$

where $P_0 = \infty I$ when there is no prior knowledge of x, and $P_0 = 0$ when x is known. Actual vehicle data used in the vehicle dynamics model and the vehicle fuel consumption model are gathered and model coefficients are adjusted using recursive least squares.

At block 516, cruise control system 500 includes an engine torque model for the vehicle's motive power source. The engine torque model describes the delay in engine torque production from a time engine torque is requested. The engine torque model may be expressed as:

$$\frac{dT}{dt} = -\frac{1}{\tau(T_d, N_e)} T + \frac{1}{\tau(T_d, N_e)} T_d$$

where τ is a time constant expressed as a function of engine speed $N_e$ and demand torque $T_d$; and where T is engine or motive power source output torque. The demand torque is a function of a transmission in neutral flag or integer variable in memory. Specifically, engine torque demand is:

$$T_d = T_{in}(1 - N_{fl}) + T_{idle} N_{fl}$$

where $T_{in}$ is input torque; $N_{fl}$ is the neutral flag (e.g., 1 for in neutral 0 for in a gear); and $T_{idle}$ is engine idle torque. Engine speed is also a function of the transmission in neutral flag:

$$N_e = \frac{\gamma(G) R_{FDR}}{R_{WH}} v_1 \cdot (1 - N_{fl}) + N_{idle} \cdot N_{fl}$$

where $N_{idle}$ is engine idle speed, $v_1$ is vehicle speed, and the other variables are as previously described.

At block 518, cruise control system 500 includes a lead vehicle model, or a model of a vehicle being followed by the vehicle operating in cruise control mode. The lead vehicle model is applied for systems that have knowledge of vehicles in the path of the vehicle operating in cruise control mode. The lead vehicle model has little lead vehicle information, but it is used to predict when vehicle acceleration is permitted and when vehicle deceleration may be desired. The lead vehicle may be modeled as:

$$\frac{dv_1}{dt} = a_2; \quad \frac{da_1}{dt} = -\frac{1}{\tau_1} a_1$$

where $v_1$ is the actual speed of the lead vehicle, $a_1$ is acceleration of the lead vehicle and $\tau_1$ is a time constant representing time constant of expected acceleration. The distance between the lead vehicle and the vehicle operating in cruise control mode may be expressed as:

$$\frac{dD_1}{dt} = v_1 - v$$

where $D_1$ is the distance between the lead vehicle and the vehicle operating in cruise control mode and v is the speed of the vehicle operating in cruise control mode. The speed of the lead vehicle may be estimated from the following vehicle's radar or laser distance measuring device.

At block 506, vehicle cruise control system 500 includes a cost function. The cost function describes control objectives or goals for the optimizer 530. For example, the cost function may seek to minimize fuel consumption, hold vehicle speed within a predetermined vehicle speed range bounded by an upper vehicle speed and a lower vehicle speed, maintain a minimum distance between vehicles, and constrain torque output of the vehicles motive power to less than a threshold torque. Specific details of one example cost function are described at 708 of FIG. 7.

At block 508, cruise control system 500 operating constraints are determined from driver inputs and/or from variables or functions stored in memory. In one example, the driver may input a desired vehicle speed and upper and lower vehicle speed thresholds may be determined based on the desired vehicle speed. For example, a driver may input a desired vehicle speed of 100 KPH and an upper speed threshold of 110 KPH and a lower threshold of 90 KPH may be determined by adding and subtracting an offset value from the desired vehicle speed. In other examples, the vehicle system may adjust the upper threshold vehicle speed based on a posted road speed. For example, if a driver selects a desired vehicle speed of 90 KPH and the road speed limit is 100 KPH, the upper vehicle threshold speed may be adjusted to 100 KPH. The maximum motive power source torque and minimum vehicle following distance may be predetermined and stored in memory. Alternatively, the driver may input constraint values. Further, the desired vehicle speed and speed constraints may be temporarily adjusted via a driver applying the accelerator pedal.

At block 530, cruise control system 500 applies input from blocks 506 through 518 to determine an optimal torque command or demand to output to the vehicle's motive power source. Further, optimizer 530 may selectively disengage a transmission forward gear putting the transmission into neutral (e.g., no engaged transmission gears decoupling the motive power source from vehicle wheels) to cause the vehicle to glide and increase vehicle fuel economy. Optimizer 530 may selectively engage a forward transmission gear after the transmission was previously shifted to neutral to maintain or increase vehicle speed. The optimizer solves the optimization problem using sequential quadratic programming, see FIG. 7 for additional details. Additional details as to operation of the optimizer are provided in the description of FIGS. 6A-8.

At block 520, the vehicle's transmission may be shifted into neutral so that the vehicle begins or glide, or alternatively, the vehicle's transmission may be shifted into a forward gear to accelerate the vehicle. The vehicle's transmission may be shifted into neutral by relieving hydraulic pressure on a gear clutch via a gear control solenoid. The vehicle's transmission may be shifted into a forward gear (e.g., $5^{th}$ gear) by applying hydraulic fluid pressure to a transmission gear clutch via a gear control solenoid.

At block 522, the vehicle's motive power source output torque may be adjusted. If the motive power source is an engine, engine torque may be increased via adjusting one or more of throttle position, spark timing, fuel injection timing, and cam timing or phase. If the motive power source is an electric machine, the machine torque may be adjusted via varying current supplied to the electric machine.

Thus, the cruise control system of FIG. 5 provides a torque command to a vehicle motive power source and a gear or neutral command to a transmission to optimize vehicle fuel economy when the vehicle is operating in a cruise control mode. The controller solves the cruise control problem by applying sequential quadratic programming.

The system of FIGS. 1-5 provides for a vehicle system, comprising: a vehicle including a motive torque source; and a controller in the vehicle, the controller including executable instructions stored in non-transitory memory, the instructions including an adaptive nonlinear model predictive cruise control routine. The vehicle system includes where the adaptive nonlinear model predictive cruise control routine includes a vehicle dynamics model and instructions for adapting the vehicle dynamics model. The vehicle system includes where the vehicle dynamics model is adapted via recursive least squares. The vehicle system includes where the adaptive nonlinear model predictive cruise control routine includes a vehicle fuel consumption model and instructions for adapting the vehicle fuel consumption model. The vehicle system includes where the vehicle fuel consumption model is adapted via recursive least squares. The vehicle system includes where the adaptive nonlinear model predictive cruise control routine adapts a vehicle dynamics model and a vehicle fuel consumption model real-time while the vehicle is operating on a road in a cruise control mode. The vehicle system includes where the adaptive nonlinear model predictive cruise control routine outputs a torque demand to the motive torque source.

The system of FIGS. 1-5 also provides for a vehicle system, comprising: a vehicle including a motive torque source; and a controller in the vehicle, the controller including executable instructions stored in non-transitory memory, the instructions including an adaptive nonlinear model predictive cruise control routine with transmission neutral state activation. The vehicle system further comprises a transmission coupled to the motive torque source, and where the adaptive nonlinear model predictive cruise control routine instructions include instructions for evaluating operating the vehicle with the transmission in neutral. The vehicle system includes where adaptive nonlinear model predictive cruise control routine instructions include instructions for evaluating operating the vehicle at road conditions the vehicle is expected to encounter at a future time.

In some examples, the vehicle system includes where the adaptive nonlinear model predictive cruise control routine instructions include instructions for evaluating operating the vehicle at road conditions the vehicle is expected to encounter at the future time responsive to a prediction horizon based on mapped road conditions. The vehicle system includes where the adaptive nonlinear model predictive cruise control routine instructions include instructions to output a command to the motive torque source. The vehicle system also includes where the adaptive nonlinear model predictive cruise control routine instructions include instructions to adjust a torque command supplied to the motive torque source responsive to data derived from a lead vehicle operating on a same road as the vehicle. The vehicle system includes where the adaptive nonlinear model predictive cruise control routine instructions include instructions to determine an optimal vehicle velocity profile and corresponding torque profile based on a predicted road grade ahead of a present position of the vehicle.

Figure 6A:
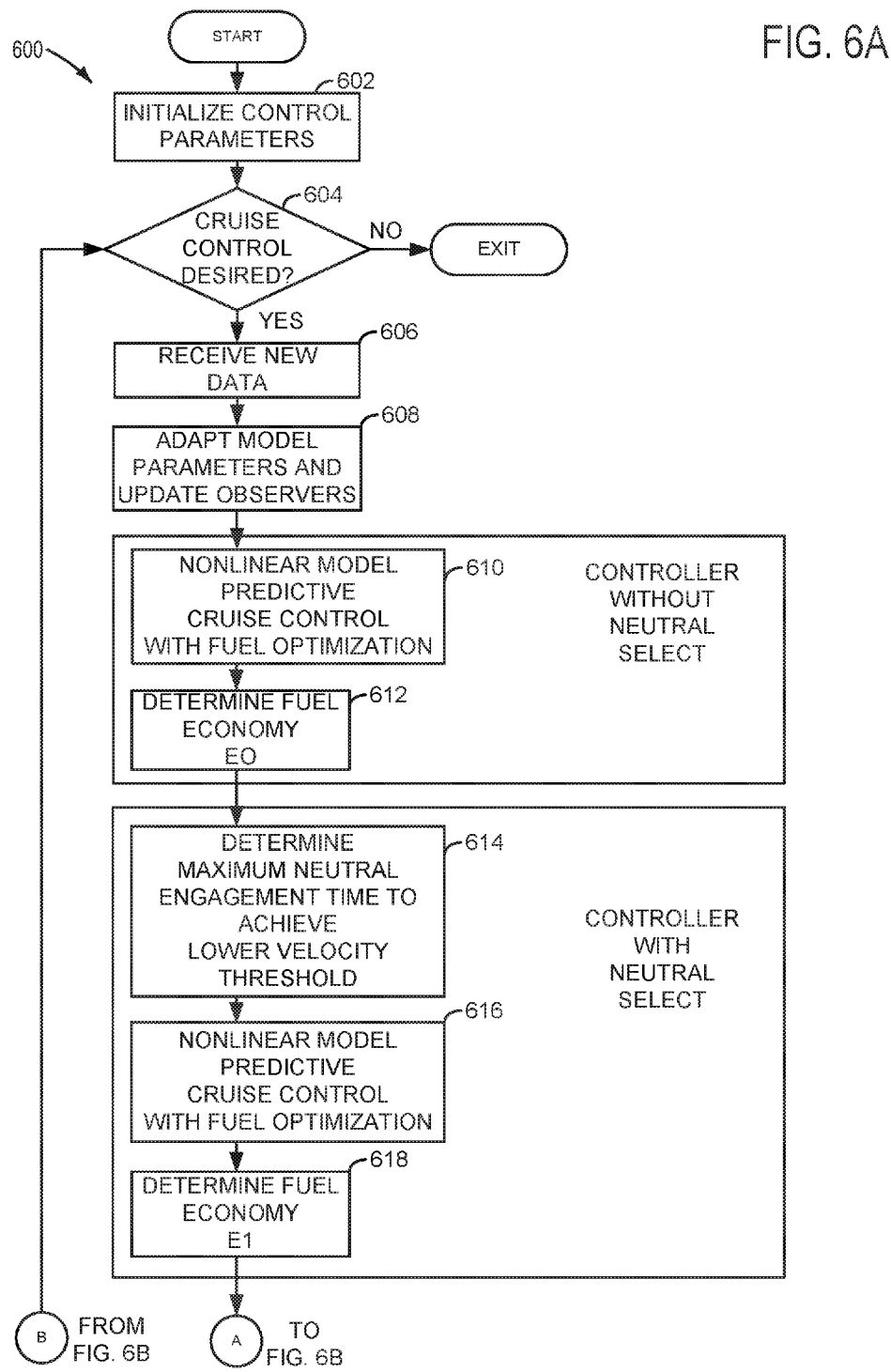
FIGS. 6A and 6B show an example method for adaptive nonlinear model predictive cruise control with fuel optimization and possibly with neutral select.
Figure 6B:
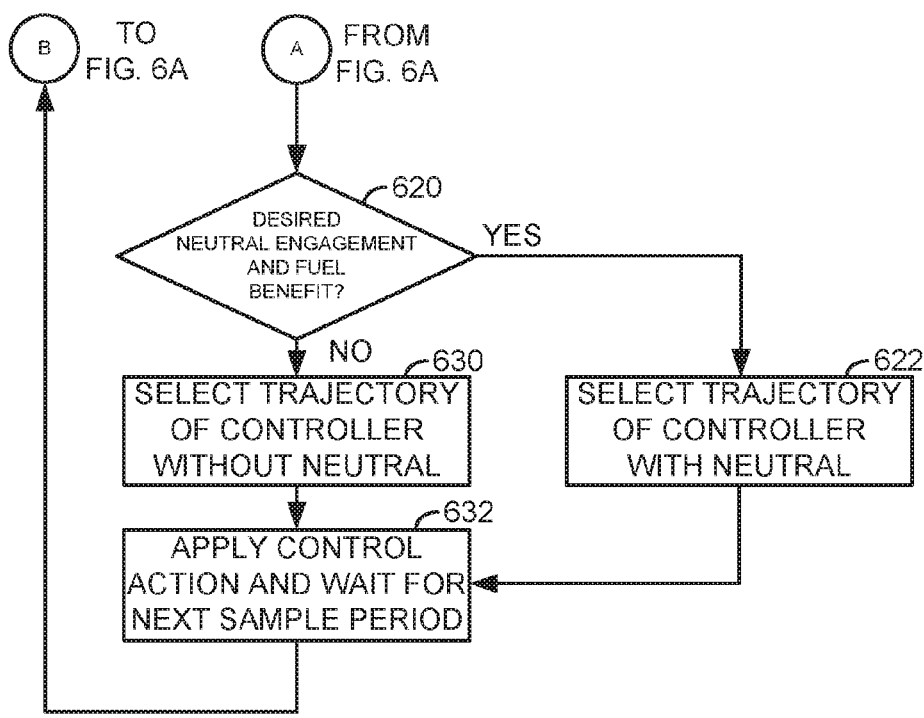

Referring now to FIGS. 6A and 6B, an example method 600 for adaptive nonlinear model predictive cruise control with fuel optimization is shown. At least portions of method 600 may be included in a system as shown in FIGS. 1-5 as executable instructions stored in non-transitory memory. The instructions may provide a control routine. Further, method 600 may include the methods of FIGS. 7 and 8. Additionally, the method of FIGS. 6A and 6B may provide the operating sequence shown in FIG. 10. The methods of FIGS. 6A-8 may be performed real-time in a vehicle driving on a road.

At 602, method 600 initializes control parameters. Control parameters to be initialized in models and optimization routines may include but are not limited to present vehicle speed, present motive power source output torque, present motive power source speed, present motive power source fuel consumption rate, present road angle the vehicle is traveling on, and selected transmission gear. Method 600 proceeds to 604 after control parameters are initialized.

At 604, method 600 judges if cruise control mode is desired. Cruise control mode may be determined to be desired in response to a driver applying a button, switch, or issuing a voice command indicating a desire to enter cruise control mode. During cruise control mode, torque output of a motive power source is adjusted via controller 12 to maintain vehicle speed within a desired speed range bounded by an upper speed threshold (e.g., 100 KPH) and a lower speed threshold (e.g., 90 KPH). Thus, vehicle torque output is adjusted to maintain a desired vehicle speed. It may be judged that cruise control mode is not desired if a driver applies a brake, operates a button, switch, or issues a voice command. If method 600 judges that cruise control mode is desired, the answer is yes and method 600 proceeds to 606. Otherwise, the answer is no and method 600 exits.

At 606, method 600 receives new data from system sensors and memory. Sensor data may include but is not limited to vehicle speed, road grade or slope, motive power source torque output, motive power source fuel consumption or energy consumption, motive power source speed, and presently selected transmission gear. Data from memory may include but is not limited to cruise control constraints, desired vehicle speed, minimum vehicle following distance to lead vehicle, and controller tuning parameters. Method 600 proceeds to 608 after new data is received.

At 608, method 600 revises or updates the β and c coefficients for the vehicle dynamics model and the vehicle fuel consumption model described at blocks 512 and 514 of FIG. 5. The β and c coefficients are adjusted based on the new data received at 606 using recursive least squares, recursive least squares with exponential forgetting, or another suitable method. The revised models are the basis for system state observers that are also updated or revised based on the revised models. Method 600 proceeds to 610 after the model coefficients are revised.

At 610, method 600 applies nonlinear model predictive control to solve for an optimal torque trajectory without neutral engagement. The nonlinear model predictive control is applied to grade entries in the electronic horizon that extend from the vehicle's present position to the forward most position of the electronic horizon. The nonlinear model predictive control outputs optimal torque values based on the constraints in the cost function described at block 708 of FIG. 7 for entries in the electronic horizon. Method 600 proceeds to 612 after the nonlinear model predictive control without neutral is applied.

At 612, method 600 determines the expected fuel economy value E0 for the prediction horizon (e.g., road grade data in the electronic horizon) for conditions when the vehicle is not operated with a transmission in neutral. In one example, method 600 estimates fuel economy for blocks (e.g., interval between grade values in the electronic horizon) in the electronic horizon by indexing a motive power source fuel or vehicle energy consumption model using the optimal torque value for the block determined at 610 and motive power source speed. The vehicle energy consumption model stores empirically determined fuel or energy consumption rates and outputs the rates. The fuel or energy consumption for the blocks is stored to memory and method 600 proceeds to 614.

At 614, method determines a maximum time for neutral engagement. The time is a based on a time to achieve the lower vehicle speed threshold. The maximum time is determined by imputing the vehicle's current operating conditions into the vehicle model described at block 512 of FIG. 5, setting engine brake torque to zero, and solving for a time it takes for the vehicle to coast or glide to the lower vehicle speed threshold. Method 600 proceeds to 616 after the maximum time for neutral engagement is determined.

At 616, applies nonlinear model predictive control to solve for an optimal torque trajectory with neutral engagement. In one example, the nonlinear model predictive control is applied to only a first grade entry in the electronic horizon ahead of the vehicle's present position to limit computational load. However, in other examples, nonlinear model predictive control may be extended to the length of the electronic horizon by increasing the controller's computational load. The nonlinear model predictive control outputs a transmission state control variable that requests the transmission enter neutral or engage a forward transmission gear based on the constraints in the cost function described at block 506 of FIG. 5 for entries in the electronic horizon. Further, the nonlinear model predictive control outputs an engine idle torque when neutral is determined to be a desired state. For blocks in the electronic horizon where neutral engagement is considered, the nonlinear model predictive controller changes simulation conditions to simulate when the transmission is in neutral and the motive power source is at idle or lower power output conditions. The nonlinear model predictive control with neutral is described in greater detail in the description of FIG. 8. Method 600 proceeds to 618 after the nonlinear model predictive control with neutral is applied.

At 618, method 600 determines the expected fuel economy value E1 for the prediction horizon (e.g., road grade data in the electronic horizon) for conditions when the vehicle is operated with a transmission in neutral. In one example, method 600 estimates fuel economy for blocks (e.g., interval between grade values in the electronic horizon) in the electronic horizon by indexing a motive power source fuel or vehicle energy consumption model using the optimal torque values for the blocks determined at 610 and motive power source speed. The vehicle energy consumption model stores empirically determined fuel or energy consumption rates and outputs the rates. The fuel or energy consumption for the blocks in the electronic horizon vector are stored to memory and method 600 proceeds to 620.

At 620, method 600 judges if it is desired to operate the vehicle with the vehicle's transmission in neutral. In one example, the answer is yes and method 600 proceeds to 622 in response to the expected fuel economy value E1 being greater than the expected fuel economy E0. In other words, if operating the vehicle in neutral provides higher fuel economy while vehicle speed is within the upper and lower speed thresholds, the answer is yes and method 600 proceeds to 622. If the expected fuel economy value E1 is less than the expected fuel economy value E0, or if vehicle speed is expected to be less than the lower threshold vehicle speed when the vehicle's transmission is in neutral, the answer is no and method 600 proceeds to 630.

At 622, method 600 selects a trajectory of control where the vehicle's transmission in neutral. The trajectory is the output from step 616 and it includes a vector or array that requests the vehicle's transmission operate in neutral at least in one block of the electronic horizon. The trajectory also includes a torque demand vector or array for operating the vehicle's motive power source operate at idle or another low energy consumption state (e.g., stopping engine operation or motor rotation). Method 600 proceeds to 632 after selecting the desired control trajectory.

At 630, method 600 selects a trajectory of control where the vehicle's transmission engaged in a forward gear. The trajectory is the output from step 610 and it includes a torque demand for maintaining vehicle speed within the upper and lower vehicle speed threshold values. The torque demand also provides for minimizing vehicle fuel consumption. Method 600 proceeds to 632 after selecting the desired control trajectory.

At 632, method 600 applies control actions to actuators and then waits for a next sample period. The control actions that are taken are for operating the vehicle in the electronic horizon block that corresponds to the present vehicle position. The control actions are based on the trajectory selected at 622 or 630. If the control action includes changing the vehicle's transmission operating state from neutral to a forward gear or vice-versa, a state of one or more transmission clutches may change to shift the transmission into neutral or a forward gear. The vehicle's motive power source output may be adjusted in response to a change in requested motive power source torque via changing a state of a torque actuator such as throttle position, cam timing, spark advance, fuel injection timing, or an amount of current supplied to an electric machine. Method 600 returns to 604 after control actions are applied to the vehicle.

Figure 7:
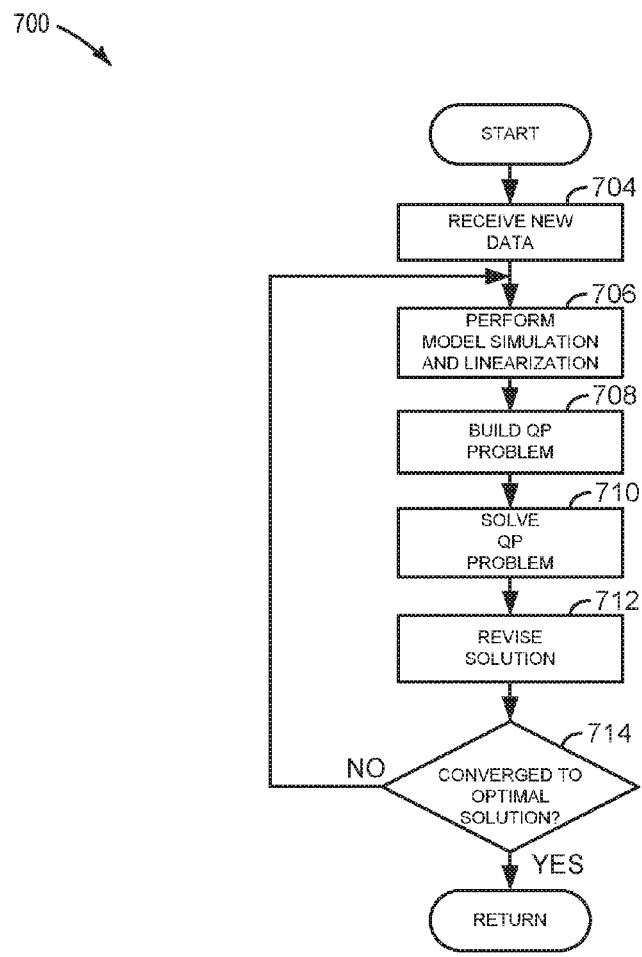
FIG. 7 shows a detailed example method of optimization for nonlinear model predictive cruise control, named at sequential quadratic programming (SQP) Iterations.

Referring now to FIG. 7, a detailed example of a numerical method for nonlinear model predictive cruise control is shown. The method uses sequential quadratic programming (SQP) to solve the nonlinear optimization problem. A j-th iteration of a SQP solver may be written as:

$$\Delta x^j = \underset{\Delta x}{\mathrm{argmin}} \|f(x^j) + \nabla f(x^j)\Delta x\|_Q^2,$$

$$\text{s.t.} \quad x_{min} \le x^j + \Delta x^j \le x_{max}..$$

The new iteration is given by:

$x^{j+1} = x^j + \alpha^j \cdot \Delta x^j$, where $\alpha_j$ is a suitable step length. Selection of $\alpha_j$ is important to ensure fast convergence of the algorithm. Generally, a suitable value can be found by applying a line search algorithm. For the systems with relatively benign nonlinearities, the step length may be chosen as a constant, but it should also be chosen such that the cost function is decreasing in all foreseeable scenarios.

At 704, method 700 receives new data from 606 of FIG. 6A. Alternatively, method 700 may retrieve data from memory and vehicle sensors as is described at 606 of FIG. 6A. Method 700 proceeds to 706 after new data is received.

At 706, method 700 performs simulations and linearization. The simulations and linearization are performed on the models describe a blocks 512-518. Assuming a nonlinear system is described by:

$$\frac{dx(t)}{dt} = f(x(t), u(t))$$
$$y(t) = g(x(t), u(t))$$

where x is the system state, u is the system input, y is the system output, and f and g denote functions. Simulating the system over the prediction or electronic horizon may be accomplished by solving the above ordinary differential equation numerically by a suitable solver, such as a basic forward Euler method. One step of the Euler method at time $t_k = t_0 + kT_s$ may be written as:

$x(t_{k+1}) \approx x(t_k) + T_s \cdot f(x(t_k), u(t_k))$

The linearization of the above ordinary differential equation at time $t_k = t_0 + kT_s$ in a point $\hat{x}(t_k), \hat{u}(t_k)$ may be written as:

$$\frac{d\Delta x(t_k)}{dt} = \frac{\partial f(x(t_k), u(t_k))}{\partial x(t_k)} \Delta x(t_k) + \frac{\partial f(x(t_k), u(t_k))}{\partial u(t_k)} \Delta u(t_k)$$

$$\Delta y(t_k) = \frac{g(x(t_k), u(t_k))}{\partial x(t_k)} \Delta x(t_k) + \frac{g(x(t_k), u(t_k))}{\partial u(t_k)} \Delta u(t_k)$$

where $u(t_k) = \hat{u}(t_k) + \Delta u(t_k)$ $x(t_k) \approx \hat{x}(t_k) = \Delta x(t_k)$ $y(t_k) \approx \hat{y}(t_k) + \Delta y(t_k)$ The linearized system is discretized to obtain a finite parameterization in the system input and one step prediction:

$\Delta x(t_{k+1}) = A_k \Delta x(t_k) + B_k \Delta u(t_k)$ $\Delta y(t_k) = C_k \Delta x(t_k) + D_k \Delta u(t_k)$ The approximate discretization may be written as:

$$A_k = I + T_s \frac{\partial f(x(t_k), u(t_k))}{\partial x(t_k)}$$

$$B_k = T_s \frac{\partial f(x(t_k), u(t_k))}{\partial u(t_k)}$$

$$C_k = \frac{g(x(t_k), u(t_k))}{\partial x(t_k)}$$

$$D_k = \frac{g(x(t_k), u(t_k))}{\partial u(t_k)}$$

The linearization is evaluated at each sampling period for each block in the electronic or prediction horizon which enables forming a sensitivity matrices H for the predicted trajectory to the system inputs. The linearized prediction of the system output may be written as:

$\Delta \vec{Y} = H \Delta \vec{U}$ where $$\Delta \vec{Y} = \begin{bmatrix} \Delta y(t_1) \\ \Delta y(t_2) \\ \Delta y(t_3) \\ \vdots \end{bmatrix}, \Delta \vec{U} = \begin{bmatrix} \Delta u(t_1) \\ \Delta u(t_2) \\ \Delta u(t_3) \\ \vdots \end{bmatrix}, H = \begin{bmatrix} D_1 & 0 & 0 & \cdots \\ C_2 B_1 & D_2 & 0 & \cdots \\ C_3 A_2 B_1 & 0 & 0 & \cdots \\ \vdots & \vdots & \vdots & \ddots \end{bmatrix}$$

Method 700 proceeds to 708 after simulation and linearization are performed.

At 708, method 708 builds the quadratic programming (QP) problem. The QP problem is built based on a cost function and constraints. In one example, the cost function may be expressed as:

$$J = q_N (v(t_N) - v_{end}(t_N))^2 + q_{mavg} \left( \frac{\sum_{k=1}^{N} \dot{m}_{fuel}(t_k)}{\sum_{k=1}^{N} v(t_k)} \right) +$$

$$q_{vavg} \left( v_{avg}(t_0) - \frac{1}{N} \sum_{k=1}^{N} v(t_k) \right)^2 + r_T \sum_{k=1}^{N_c} \|\delta T(t_k)\|^2$$

where J is the cost function variable, N is the prediction horizon based on the vector or array of the electronic horizon, $q_N$ is a penalty for tracking desired vehicle speed at the end of the prediction horizon, $q_{mavg}$ is the penalty for average fuel consumption on the predicted horizon, $q_{vavg}$ is the penalty for average vehicle speed tracking, and $r_T$ is the torque command activity.

The first term in the cost function represents the terminal penalty (vehicle speed at the end of the prediction horizon N). The second term is average fuel consumption over the prediction horizon. The third term is the average vehicle speed over the prediction horizon. Finally, the fourth term is the torque activity penalty $\delta T(t_k) = T(t_k) - T(t_k-1)$, or the change in engine or motive power source torque between k steps. The cost function constraints may be expressed as:

$v_{min} - \epsilon_1(t_k) \leq v(t_k) \leq v_{max} + \epsilon_1(t_k), k=1,2,\ldots,N_{vlim}$ $T_{min} \leq T(t_k) \leq T_{max}, k=1,2,\ldots,N_c$ $D_{min} + t_{pmin} v(t_k) \leq D_l(t_k) + \epsilon_2(t_k), k=1,2,\ldots,N_{Dlim}$ where $N_{vlim}$ is number of points of vehicle speed limit, $N_{Dlim}$ is a lead vehicle distance limit in the prediction horizon, and where $\epsilon_1(t_k)$ and $\epsilon_2(t_k)$ are auxiliary softening variables. The auxiliary softening variables $\epsilon_1(t_k)$ and $\epsilon_2(t_k)$ ensure feasibility of the resulting nonlinear optimization problem, the vehicle speed limits and distance to the lead vehicle limit are handled as soft constraints by introducing auxiliary softening variables $\epsilon_1(t_k)$ and $\epsilon_2(t_k)$. Note that the minimum distance to the lead vehicle is comprised of two parts. The first part $D_{min}$ is the specified minimum distance and the second part $t_{pmin} v(t_k)$ is parameterized by time $t_{pmin}$ which represents specified minimum time to reach $D_{min}$ gap between the host and lead vehicle.

The optimization variable J is the torque trajectory (together with softening variables) over the prediction horizon. A blocking technique is used to reduce the number of the optimization variables with the goal of decreasing real-time computation and memory allocation. As a result, the control action of adjusting motive power source torque is not computed in each sampling period over the prediction horizon. Instead, several sampling times are blocked (grouped) and the control action within each block is assumed to be fixed (e.g., not changing). This may be expressed as a linear transformation of the optimization variable (torque)

$$\vec{T} = B_{bl} \vec{T}_{bl}$$

where $B_{bl}$ is a transformation (blocking) matrix and torque trajectories $$\vec{T} = [T(t_1) T(t_2) \ldots T(t_{N_c})],$$

$$\vec{T}_{bl} = [T(t_{b(1)}) T(t_{b(2)}) \ldots T(t_{b(n_{bl})})]^T,$$

where $n_{bl}$ is total number of blocks and b is a vector of length specifying a number of samples in each individual block. Vector $\vec{T}_{bl}$ becomes new optimization variable replacing the original trajectory $\vec{T}$. Method 700 proceeds to 710 after the QP problem is built.

At 710, method 700 solves the QP problem. The final QP approximation in j-th SQP iteration may be describes as:

$$\{\Delta \vec{T}, \varepsilon_v^{j*}, \varepsilon_D^{j*}\} = \operatorname{argmin}_{\Delta \vec{T}, \varepsilon_v^j, \varepsilon_D^j} \{J^j + J_{v_{lim}}^j + J_{D_{lim}}^j\}$$

where $\vec{T}$ is the trajectory, j is iteration, $\varepsilon_v^{j*}$ is a vector of softening variables for vehicle speed limit where $v_{min} \leq \varepsilon_v(t_k) \leq v_{max}$, $\varepsilon_D^{j*}$ is vector of softening variables for the distance limit to the lead vehicle where $D_{min} \leq \varepsilon_D(t_k)$, $J^j$ is the cost function j-th iteration as described above, $J_{v_{lim}}^j$ is a cost function associated with the softened vehicle speed limit given by $$J_{v_{lim}} = \sum_{k=1}^{N_{vlim}} \|v_1(t_k) - \varepsilon_v(t_k)\|_{\rho_{vlim}}^2,$$

and $J_{D_{lim}}^j$ is a cost function associated with the softened distance limit to the lead vehicle given by $$J_{D_{lim}} = \sum_{k=1}^{N_{Dlim}} \|D_p(t_k) - T_{pmin} v_1(t_k) - \varepsilon_D(t_k)\|_{\rho_{vlim}}^2.$$

Method 700 proceeds to 712 after the QP problem is solved.

At 712, method 700 updates or revises the solution. According to the SQP solver described above, the trajectory may be revised or updated as:

$$\vec{T}^{j+1} = \vec{T}^j + \alpha^j \cdot \Delta \vec{T}^{j*}$$

The revised torque trajectory is the starting point for the next (j+1)-th SQP iteration. Method 700 proceeds to 714 after the solution is revised.

At 714, method 700 judges if the solution has converged to an optimal solution. In some examples, the solution may be compared to the cost function. However, for receding horizon problems the solution may be determined to converge within a predetermined number of iterations (e.g., 1 or 2). If method 700 judges that the solution has converged to the optimal solution, the answer is yes and method 700 proceeds to exit or return to 610 of FIG. 6A.

Thus, the method of FIG. 7 adjusts a torque command supplied to a motive torque source responsive to a distance between the vehicle operating in cruise control mode and a lead vehicle ahead of the vehicle operating in cruise control mode when the vehicle is operating in a forward gear. The method of FIG. 7 also determines an optimal vehicle velocity profile based on constraints.

Figure 8:
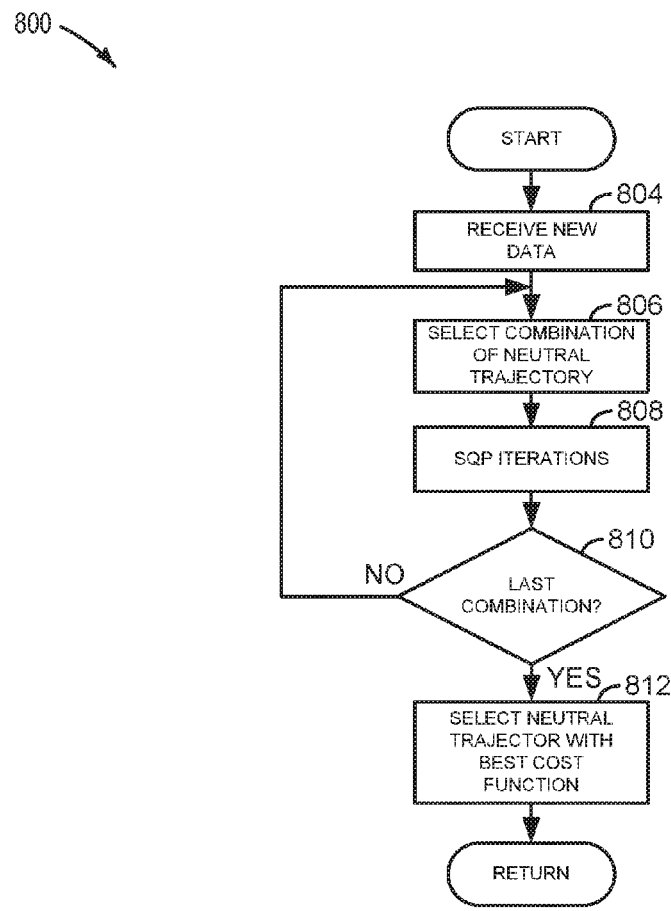
FIG. 8 shows a detailed example method for nonlinear model predictive cruise control with fuel optimization and with neutral select.

Referring now to FIG. 8, an example method for nonlinear model predictive cruise control with fuel optimization and with neutral select is shown. Neutral select refers to the controller having the capacity to change the vehicle's transmission operating state from a forward gear to neutral or vice-versa to improve vehicle fuel economy in cruise control mode. By commanding a transmission to neutral, it may be possible to increase or maintain vehicle speed on flat or negative road grades since engine braking and some driveline losses are not resisting a portion gravitational force acting on the vehicle when a transmission is shifted to neutral.

The transmission operating state is a binary variable having a value of 0 for the transmission not being in neutral and a value of 1 for the transmission being in neutral. If the electronic or prediction horizon is comprised of $N_d$ points, the number of possible transmission operating state combinations for operating the transmission in a gear or neutral is $2^{N_d}$. Therefore, the algorithm of FIG. 8 may be executed $2^{N_d}$ to arrive at the minimum cost function. However, to reduce computational load on the controller, it may be desirable to iterate only once for a first block in the electronic or prediction horizon.

At 804, method 800 receives new data from 606 of FIG. 6A. Alternatively, method 800 may retrieve data from memory and vehicle sensors as is described at 606 of FIG. 6A. Method 800 proceeds to 806 after new data is received.

At 806, method 800 selects one or more predefined neutral trajectories on the electronic or prediction horizon with suitable combinations of neutral engagement having a fixed duration and start position in the electronic or prediction horizon. All predefined neutral trajectories are evaluated together with corresponding computed torque trajectories with respect to vehicle fuel economy and constraint violations. A trajectory that has not been evaluated is selected at 806.

At 808, the SQP procedure as described at 706-714 of FIG. 7 is performed to determine a torque trajectory corresponding to the predefined neutral trajectory selected at 806. Further, a corresponding estimate of fuel economy Ei on the prediction horizon is computed and stored to memory as described at 612 of FIG. 6A. It should be noted that for evaluating neutral engagements, the motive power source torque is set to a low value such as zero or an engine idle torque when evaluating neutral engagement conditions so that the motive power source energy consumption or fuel consumption is accurate. Method 800 proceeds to 810 after the SQP procedure is performed.

At 810, method 800 judges if all combinations of neutral engagement have been evaluated. If so, the answer is yes and method 800 proceeds to 812. Otherwise, the answer is no and method 800 returns to 806 and the next neutral trajectory is evaluated.

At 812, method 800 selects a neutral trajectory and corresponding torque trajectory that provides the best fuel economy from the combinations of neutral trajectories. Method 800 proceeds to exit or return to 620 of FIG. 6B.

Thus, the method of FIG. 8 evaluates operation of a vehicle with a transmission in neutral while the vehicle is in a cruise control mode without the vehicle actually having to be in neutral. The evaluation is at least partially based on road conditions the vehicle is expected to encounter at a future time, the road conditions at the future time based on a map of road conditions stored in memory.

The method of FIGS. 6A-8 provides for a vehicle cruise control method, comprising: receiving vehicle information from one or more sensors to a controller; providing a torque command responsive to output of an adaptive nonlinear model predictive cruise control routine executed by the controller; and adjusting a torque actuator of a motive torque source responsive to the torque command. The method includes where the adaptive nonlinear model predictive cruise control routine provides for selectively shifting a transmission of a vehicle into neutral while the vehicle is operating in a cruise control mode. The method includes where the torque command is within a first threshold range bounded by a first lower torque threshold and a first upper torque threshold if the adaptive nonlinear model predictive cruise control routine receives data from a convex shaped vehicle fuel consumption model while the vehicle is operating under a first set of conditions. The method includes where the torque command is within a second threshold range bounded by a second lower torque threshold and a second upper torque threshold if the adaptive nonlinear model predictive cruise control routine receives data from a nonconvex shaped vehicle fuel consumption model while the vehicle is operating under the first set of conditions, the second threshold range having a greater torque difference between the second lower torque threshold and the second upper torque threshold than the torque difference between the first lower torque threshold and the first upper torque threshold, the second lower torque threshold less than the first lower torque threshold. The method includes where the motive torque source is an engine, where the torque command is based on a prediction horizon, and where the prediction horizon includes road grade data. The method includes where the torque command is further based on a state of a lead vehicle ahead of a vehicle including the controller.

Referring now to FIG. 9A, a plot of an example convex vehicle fuel consumption model is shown. The vehicle fuel consumption model may also be referred to as a map in some examples. The vertical axis represents fuel flow rate to an engine. The horizontal axis represents engine torque. The axis directed into the paper is engine speed. The vehicle fuel consumption model stores empirically determined values of fuel consumption or use rate corresponding to selected engine speeds and torques. The fuel consumption values form a convex surface when linked together as shown and viewed from a perspective of the horizontal axis. The vehicle fuel consumption model shape may change with fuel type (e.g., gasoline, alcohol and gasoline, alcohol), ambient engine operating conditions, and other conditions. The vehicle fuel consumption model shape (e.g., convex, non-convex, affine) can influence controller output since the optimal torque solution is also optimized for minimum fuel consumption. The vehicle fuel model shape and the expected controller output may be determined from values of coefficients of a polynomial that describes the vehicle fuel consumption model. For example, if the coefficients indicate the vehicle fuel model is convex, the controller described in FIGS. 6A-8 provides a narrow band torque request that varies between an upper torque threshold and a lower torque threshold, the lower torque threshold greater than zero torque. The torque solution output by the controller of FIGS. 6A-8 may be referred to as a constant torque solution for a convex vehicle fuel consumption model, although the requested torque does vary to maintain vehicle speed. The narrow band torque request output by the controller for the convex vehicle consumption model includes a lower torque threshold that is a greater torque than a lower torque threshold for a non-convex vehicle fuel consumption model. Further, the narrow band torque request output by the controller for the convex vehicle fuel consumption model includes an upper torque threshold that is a lower torque than an upper torque threshold for the non-convex vehicle fuel consumption model.

Referring now to FIG. 9B, a plot of an example non-convex vehicle fuel consumption model is shown. The vehicle fuel consumption model may also be referred to as a map in some examples. The vertical axis represents fuel flow rate to an engine. The horizontal axis represents engine torque. The axis directed into the paper is engine speed. The vehicle fuel consumption model stores empirically determined values of fuel consumption or use rate corresponding to selected engine speeds and torques. The fuel consumption values form a non-convex surface when linked together as shown and viewed from a perspective of the horizontal axis. The torque solution output from the controller of FIGS. 6A-8 may be referred to as a pulse and glide torque solution. The torque request is pulse shaped swinging from zero torque requested at vehicle wheels to higher torque values than if a same route is driven in the same vehicle when the fuel model is convex. Thus, for a same vehicle driving a same route under same conditions except for the fuel consumption model shape, the controller of FIGS. 6A-8 outputs the constant torque solution for a convex vehicle fuel consumption model and a pulse and glide torque solution for a non-convex fuel consumption model. The pulse and glide torque solution demands zero torque at the vehicle wheels at times such that the vehicle glides or coasts. Neutral engagement may be particularly useful for non-convex fuel consumption models as neutral engagement may extend the glide or zero torque duration. The pulse and glide torque solution also requests greater torques than the constant torque solution. Thus, the controller torque solution (e.g., constant torque or pulse and glide) may be determined via the vehicle fuel consumption model shape.

Referring now to FIG. 10, an example vehicle cruise control sequence for the system of FIGS. 1-5 and the method of FIGS. 6A-8 is shown. Vertical markers at times T1-T4 represent times of interest during the sequence. All of the plots occur at a same time and same vehicle operating conditions. In cruise control mode, the vehicle wheel torque command or motive power source torque demand is provided via a controller other than a driver. The controller has objectives in cruise control mode that influence the torque demand output by the controller, and the objectives may be at least partially defined by constraints such as minimize fuel consumption, maintain vehicle speed within upper and lower threshold speeds that define a desired vehicle speed range, neutral use benefit, maximum neutral duration, and maximum wheel torque. The controller may vary the torque demand in cruise control mode to hold vehicle speed within the desired vehicle speed range without driver input to the controller or without the driver requesting torque from a motive power source. Thus, the torque command in cruise control mode may be based on a desired vehicle speed requested by a driver. A controller may adjust torque of a motive torque source to achieve the desired vehicle speed.

The first plot from the top of FIG. 10 is a plot of a calculated maximum neutral duration versus time. The maximum neutral duration corresponds to an amount of time a transmission may be in neutral while contemporaneously holding vehicle speed within a desired vehicle speed range. The maximum neutral duration may be estimate via a model as is described in the method of FIGS. 6A-8. The horizontal axis represents time and time increases from the left side of the plot to the right side of the plot. The vertical axis represents the maximum neutral duration and the maximum neutral duration increases in the direction of the vertical axis arrow. Horizontal line 1002 represents a threshold maximum neutral duration that is to be exceeded for the transmission to be commanded into neutral if the transmission is in gear.

The second plot from the top of FIG. 10 is a plot of a calculated neutral use benefit versus time. The use benefit corresponds to vehicle fuel economy while the vehicle's transmission is shifted to neutral. The neutral use benefit may be estimated by determining vehicle fuel economy for when the transmission is in neutral. The horizontal axis represents time and time increases from the left side of the plot to the right side of the plot. The vertical axis represents the neutral use benefit and the benefit increases in the direction of the vertical axis arrow. Horizontal line 1004 represents a threshold neutral use benefit that is to be exceeded for the transmission to be commanded into neutral if the transmission is in gear.

The third plot from the top of FIG. 10 is a plot of transmission state versus time. The transmission state indicates if the transmission is in neutral or a gear. The horizontal axis represents time and time increases from the left side of the plot to the right side of the plot. The vertical axis represents transmission state. The transmission is in neutral when the trace is at a higher level near the vertical axis arrow. The transmission is in a gear when the trace is at a lower level near the horizontal axis.

The fourth plot from the top of FIG. 10 is a plot of vehicle velocity versus time. The horizontal axis represents time and time increases from the left side of the plot to the right side of the plot. The vertical axis represents vehicle velocity and vehicle velocity increases in the direction of the vertical axis arrow. Horizontal line 1006 represents a lower threshold vehicle velocity. The vehicle cruise controller's objective is to maintain vehicle velocity above threshold 1006 while the vehicle is in cruise control mode.

At time T0, the vehicle is in cruise control mode. The maximum neutral duration is increasing from a middle level and the vehicle velocity is decreasing from a higher level within the cruise control desired vehicle speed range. Such conditions may be indicative of the vehicle approaching a top of a hill. The neutral use benefit is increasing from a lower level and the transmission is in a forward gear.

Between time T0 and time T1, the vehicle velocity continues to decrease and the maximum neutral duration increases to a value above threshold 1002. The neutral use benefit remains below threshold 1004 and the transmission remains in a forward gear. The transmission state does not change even though the maximum neutral duration exceeds threshold 1002 at times since the neutral use benefit does not exceed threshold 1004.

At time T1, the transmission changes state from a forward gear to neutral. The transmission is shifted to neutral in response to the maximum neutral duration being greater than threshold 1002 and the neutral use benefit being greater than threshold 1004. The vehicle velocity begins to slowly decrease in response to the transmission being in neutral.

Between time T1 and time T2, the vehicle velocity continues to decrease and the transmission remains in neutral. The maximum neutral duration falls below threshold 1002 and the neutral use benefit falls below threshold 1004. Nevertheless, the transmission remains in neutral to extend the vehicle fuel economy benefit of gliding or coasting in neutral.

At time T2, the vehicle velocity decreases to threshold level 1006 and the transmission is shifted into a forward gear in response to vehicle speed being at or below threshold level 1006. The maximum neutral duration is less than threshold level 1002 and the neutral use benefit is less than threshold level 1004.

Between time T2 and time T3, the transmission remains engaged in a forward gear and the vehicle velocity increases. The maximum neutral duration also exceeds threshold 1002. The neutral use benefit is less than threshold 1004. The transmission does not enter neutral because threshold 1004 is not exceeded.

At time T3, the transmission changes state from a forward gear to neutral. The transmission is shifted to neutral in response to the maximum neutral duration being greater than threshold 1002 and the neutral use benefit being greater than threshold 1004. The vehicle velocity begins to slowly decrease in response to the transmission being in neutral.

Between time T3 and time T4, the vehicle velocity continues to decrease and the transmission remains in neutral. The maximum neutral duration falls below threshold 1002 and the neutral use benefit falls below threshold 1004. The transmission remains in neutral to extend the vehicle fuel economy benefit of gliding or coasting in neutral.

At time T4, the vehicle velocity decreases to threshold level 1006 and the transmission is shifted into a forward gear in response to vehicle speed being at or below threshold level 1006. The maximum neutral duration is less than threshold level 1002 and the neutral use benefit is less than threshold level 1004.

In this way, a transmission may be selectively shifted to and from neutral to extend vehicle fuel economy. The vehicle controller selectively shifts to neutral depending on conditions vehicle operating conditions and road grade or road slope value in the prediction or electronic horizon. The controller may act to shift the transmission to neutral in response to a negative road grade and other vehicle conditions. Further, the controller may act to shift the transmission to neutral in response to a change in road grade from a positive grade to a negative grade or zero grade as determined from the prediction or electronic horizon.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
a vehicle including a motive torque source;
a transmission coupled to the motive torque source, the transmission including a neutral state and a forward gear; and
a controller in the vehicle, the controller including executable instructions stored in non-transitory memory, the instructions including an adaptive nonlinear model predictive cruise control routine; wherein
the controller includes further instructions for:
in response to a convex fuel consumption model, operating the transmission in the forward gear, and
in response to a non-convex fuel consumption model, operating the transmission in the neutral state.

2. The vehicle system of claim 1, where the adaptive nonlinear model predictive cruise control routine includes a vehicle dynamics model and instructions for adapting the vehicle dynamics model, including adaptive coefficients of the vehicle dynamics model to compensate for changes in vehicle mass, wind, and tire condition, and where, in response to the convex fuel consumption model, the motive torque source is operated at a torque selected based on a fuel consumption model to minimize fuel consumption.

3. The vehicle system of claim 2, where the vehicle dynamics model is adapted via recursive least squares, and where the motive torque source is operated at an idle torque when the transmission is in the neutral state.

4. The vehicle system of claim 3, where the adaptive nonlinear model predictive cruise control routine includes instructions for adapting the fuel consumption model, and where, in response to the non-convex fuel consumption model and a vehicle speed dropping to a first threshold level, adjusting the transmission to the forward gear and operating the motive torque source at a torque greater than the idle torque.

5. The vehicle system of claim 4, where the fuel consumption model is adapted via recursive least squares, and where the fuel consumption model is adjusted based on an upcoming road grade.

6. The vehicle system of claim 1, where the adaptive nonlinear model predictive cruise control routine adapts a vehicle dynamics model and a fuel consumption model real-time while the vehicle is operating on a road in a cruise control mode.

7. The vehicle system of claim 1, where the adaptive nonlinear model predictive cruise control routine outputs a torque demand to the motive torque source.

8. A vehicle system, comprising:
a vehicle including a motive torque source;
a transmission operatively coupled to the motive torque source, the transmission having a neutral state and a forward gear; and
a controller in the vehicle, the controller including executable instructions stored in non-transitory memory, the instructions including an adaptive nonlinear model predictive cruise control routine with transmission neutral state activation, wherein
the controller includes further instructions to:
operate in a constant torque mode in response to a first condition being met, and
operate in a pulse-and-glide mode in response to the first condition not being met, where adaptive nonlinear model predictive cruise control routine instructions include instructions to predict an optimal vehicle velocity profile and a corresponding torque profile based on a predicted road grade ahead of a present position of the vehicle; wherein the first condition being met includes a fuel consumption model being convex, and wherein the first condition not being met includes the fuel consumption model not being convex.

9. The vehicle system of claim 8, where the adaptive nonlinear model predictive cruise control routine instructions include instructions for evaluating operating the vehicle at road conditions the vehicle is expected to encounter at a future time; and wherein the pulse-and-glide mode includes alternating between accelerating the vehicle with the transmission in the forward gear and coasting the vehicle with the transmission in the neutral state.

10. The vehicle system of claim 9, where the adaptive nonlinear model predictive cruise control routine instructions include instructions for evaluating operating the vehicle at road conditions the vehicle is expected to encounter at the future time responsive to a prediction horizon and based on mapped road conditions; and wherein the accelerating is performed until a vehicle speed reaches an upper threshold, and the coasting is performed until the vehicle speed reaches a lower threshold.

11. The vehicle system of claim 10, where the adaptive nonlinear model predictive cruise control routine instructions include instructions to adjust a torque command supplied to the motive torque source responsive to data derived from a lead vehicle operating on a same road as the vehicle, and wherein the coasting includes operating an engine at an idle torque.

12. The vehicle system of claim 8, where the adaptive nonlinear model predictive cruise control routine instructions include instructions to output a command to the motive torque source; and wherein the constant torque mode includes operating the motive torque source at a torque and operating the transmission in the forward gear.

13. A vehicle cruise control method, comprising:
receiving vehicle information from one or more sensors of a vehicle to a controller;
providing a torque command and a transmission command responsive to output of an adaptive nonlinear model predictive cruise control routine executed by the controller, the adaptive nonlinear model predictive cruise control routine being adapted based on the vehicle information;
adjusting a torque actuator of a motive torque source responsive to the torque command;
adjusting a gear selection of a transmission responsive to the transmission command; and
when a fuel consumption model is non-convex,
in response to a vehicle speed increasing to an upper threshold, adjusting the gear selection to a neutral state, adjusting the torque actuator to deliver an idle torque, and coasting the vehicle, and
in response to the vehicle speed decreasing to a lower threshold, adjusting the gear selection to a forward gear, adjusting the torque actuator to deliver a torque greater than the idle torque, and accelerating the vehicle.

14. The method of claim 13, where the adaptive nonlinear model predictive cruise control routine provides for selectively shifting the transmission of the vehicle into neutral while the vehicle is operating in a cruise control mode; the method further comprising,
when the fuel consumption model is convex, adjusting the gear selection to the forward gear and adjusting the torque actuator to deliver a torque.

15. The method of claim 14, wherein, when the fuel consumption model is convex, the torque command is within a first threshold range bounded by a first lower torque threshold and a first upper torque threshold.

16. The method of claim 15, wherein, when the fuel consumption model is non-convex, the torque command is within a second threshold range bounded by a second lower torque threshold and a second upper torque threshold if the adaptive nonlinear model predictive cruise control routine receives data from a non-convex shaped vehicle fuel consumption model while the vehicle is accelerating, the second threshold range greater than the first threshold range, the second lower torque threshold less than the first lower torque threshold.

17. The method of claim 15, where the motive torque source is an engine, where the torque command is based on a prediction horizon, and where the prediction horizon includes road grade data, and where the torque is selected to minimize fuel consumption based on the fuel consumption model.

18. The method of claim 17, where the torque command is further based on a state of a lead vehicle ahead of the vehicle including the controller, and where the fuel consumption model is adjusted based on the vehicle information including an upcoming road grade.

\* \* \* \* \*